United States Patent
Lv et al.

(10) Patent No.: US 11,750,310 B2
(45) Date of Patent: Sep. 5, 2023

(54) CLOCK SYNCHRONIZATION PACKET EXCHANGING METHOD AND APPARATUS

(71) Applicant: Huawei Technologies Co., Ltd., Shenzhen (CN)

(72) Inventors: Jingfei Lv, Wuhan (CN); Boling Fan, Dongguan (CN); Jinhui Wang, Dongguan (CN); Liqing Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/471,676

(22) Filed: Sep. 10, 2021

(65) Prior Publication Data

US 2021/0409140 A1    Dec. 30, 2021

Related U.S. Application Data

(63) Continuation of application No. PCT/CN2019/077686, filed on Mar. 11, 2019.

(51) Int. Cl.
*H04L 7/04* (2006.01)
*H04J 3/06* (2006.01)
*H04L 7/00* (2006.01)

(52) U.S. Cl.
CPC .......... *H04J 3/0667* (2013.01); *H04L 7/0012* (2013.01); *H04L 7/0025* (2013.01); *H04L 7/0029* (2013.01)

(58) Field of Classification Search
CPC ....... H04J 3/0667; H04J 3/247; H04L 7/0012; H04L 7/0025; H04L 7/0029; H04L 69/28

USPC .......... 375/357, 362, 371, 373, 257
See application file for complete search history.

(56) References Cited

U.S. PATENT DOCUMENTS

| | | | |
|---|---|---|---|
| 5,822,317 A * | 10/1998 | Shibata | H04J 3/247 |
| | | | 370/473 |
| 2012/0131378 A1* | 5/2012 | Jiang | H04L 69/28 |
| | | | 714/E11.073 |
| 2013/0223458 A1 | 8/2013 | Bui | |
| 2013/0287038 A1 | 10/2013 | Zhou et al. | |

(Continued)

FOREIGN PATENT DOCUMENTS

| CN | 103001759 A | 3/2013 |
|---|---|---|
| CN | 103201971 A | 7/2013 |

(Continued)

OTHER PUBLICATIONS

Fang, Zijin, et al., "Design and Implementation of 1588 Time Synchronization Technology Based on FlexE," May 18, 2018, 5 pages.

(Continued)

*Primary Examiner* — Phuong Phu
(74) *Attorney, Agent, or Firm* — Conley Rose, P.C.

(57) ABSTRACT

A clock synchronization packet exchanging method includes sending, by a first device in a Flexible Ethernet (FlexE) group, a first FlexE instance at a first physical layer (PHY), where the first FlexE instance includes a clock synchronization packet, and a second FlexE instance sent by the first device in the FlexE group at a second PHY also includes a clock synchronization packet. The clock synchronization packets are carried in a plurality of FlexE instances transmitted between a transmit end and a receive end in the FlexE group.

20 Claims, 13 Drawing Sheets

(56) References Cited

U.S. PATENT DOCUMENTS

| | | |
|---|---|---|
| 2018/0167160 A1 | 6/2018 | Gareau et al. |
| 2019/0199505 A1 | 6/2019 | Zhang et al. |
| 2020/0252350 A1* | 8/2020 | Gareau ............... H04L 43/0864 |

FOREIGN PATENT DOCUMENTS

| | | |
|---|---|---|
| CN | 104579534 A | 4/2015 |
| CN | 107800528 A | 3/2018 |
| CN | 108880722 A | 11/2018 |
| WO | 2012065823 A1 | 5/2012 |
| WO | 2013162807 A1 | 10/2013 |

OTHER PUBLICATIONS

Oif, "Flex Ethernet 2.0 Implementation Agreement," Jun. 22, 2018, XP055726362, 51 pages.

"IEEE Standard for a Precision Clock Synchronization Protocol for Networked Measurement and Control Systems, IEEE Instrumentation and Measurement Society," Sponsored by the Technical Committee on Sensor Technology (TC-9), IEEE Std 1588, Jul. 24, 2008, 324 pages.

IA OIF-FLEXE-02.0. "Flex Ethernet 2.0 Implementation Agreement," Jun. 22, 2018, 51 pages.

\* cited by examiner

CLOCK SYNCHRONIZATION PACKET EXCHANGING METHOD AND APPARATUS

CROSS-REFERENCE TO RELATED APPLICATIONS

This is a continuation of Int'l Patent App. No. PCT/CN2019/077686, filed on Mar. 11, 2019, which is incorporated by reference.

FIELD

This disclosure relates to the communications field, and more specifically, to a clock synchronization packet exchanging method and an apparatus.

BACKGROUND

An Ethernet technology has been widely used in the network industry. A Flexible Ethernet (FlexE) technology has been proposed in the industry. For example, the Optical Internetworking Forum (OIF) has released the Flex Ethernet 2.0 Implementation Agreement.

How to transmit a clock synchronization signal by using the FlexE needs to be resolved.

Further, reliability of clock synchronization performed by using the FlexE needs to be improved.

SUMMARY

This disclosure provides a clock synchronization packet exchanging method and an apparatus. A clock synchronization packet is carried in a plurality of flexible Ethernet FlexE instances transmitted between a transmit end and a receive end in a FlexE group, and the plurality of FlexE instances are transmitted at a plurality of PHYs in the FlexE group, so that reliability of clock synchronization between the transmit end and the receive end in the FlexE group can be improved.

According to a first aspect, a clock synchronization packet sending method is provided. The method includes: A first device sends a first flexible Ethernet FlexE instance at a first physical layer PHY. The first FlexE instance includes a clock synchronization packet. The first device sends a second FlexE instance at a second PHY. The second FlexE instance includes a clock synchronization packet, and the first PHY and the second PHY are included in a same FlexE group.

According to the clock synchronization packet sending method, a transmit end (the first device) in the FlexE group separately sends a plurality of FlexE instances to a receive end in the FlexE group at a plurality of PHYs, and at least two FlexE instances that are in the plurality of FlexE instances and that are sent through at least two PHYs carry clock synchronization packets. This ensures that the receive end in the FlexE group may obtain the clock synchronization packets from the plurality of the FlexE instances. Even if one PHY is faulty, and a corresponding FlexE instance cannot be transmitted, the receive end may obtain the clock synchronization packet from another FlexE instance in the received plurality of FlexE instances, to improve reliability of clock synchronization between the transmit end and the receive end in the FlexE group.

The transmit end in the FlexE group respectively sends the first FlexE instance and the second FlexE instance to the receive end in the FlexE group only at the first PHY and the second PHY is not limited, and both the first FlexE instance and the second FlexE instance carry the clock synchronization packets. It can be learned from the description in the background that the transmit end in the FlexE group may send at least one FlexE instance to the receive end in the FlexE group at each PHY. In this case, when the transmit end in the FlexE group may send another FlexE instance to the receive end in the FlexE group at the foregoing first PHY, the transmit end may further send, to the receive end in the FlexE group at the foregoing first PHY, another FlexE instance other than the foregoing first FlexE instance, and the another FlexE instance carries the clock synchronization packet. Similarly, when the transmit end in the FlexE group may send another FlexE instance to the receive end in the FlexE group at the foregoing second PHY, the transmit end may further send, to the receive end in the FlexE group at the foregoing second PHY, another FlexE instance other than the foregoing second FlexE instance, and the another FlexE instance carries the clock synchronization packet. However, from a perspective of resource saving, when the transmit end in the FlexE group may send the plurality of FlexE instances to the receive end in the FlexE group at one PHY, one FlexE instance is usually selected from the plurality of FlexE instances to carry the clock synchronization packet.

The FlexE instance is defined in an agreement. However, this disclosure does not impose a limitation that the FlexE instance can only be referred to as a FlexE instance. For example, the FlexE instance may also be referred to as a FlexE entity.

With reference to the first aspect, in some implementations of the first aspect, the first device includes a first clock device, and when the first PHY and the second PHY are in a normal state, the clock synchronization packet included in the first FlexE instance or in the second FlexE instance is a packet used by the first clock device to perform clock synchronization on a second clock device.

According to the clock synchronization packet sending method, the transmit end in the FlexE group is referred to as the first device, and a clock device in the first device is the first clock device. Similarly, the receive end in the FlexE group may be referred to as a second device, and a clock device in the second device is the second clock device. Specifically, the clock synchronization packets included in the foregoing first FlexE instance and in the second FlexE instance are packets used by the first clock device to perform clock synchronization on the second clock device. Clock synchronization between a clock device in the transmit end in the FlexE group and a clock device in the receive end in the FlexE group is implemented. To be specific, in a case that the transmit end in the FlexE group sends the plurality of FlexE instances to the receive end in the FlexE group at the plurality of PHYs, and all the plurality of PHYs can successfully transmit the plurality of FlexE instances, when the clock device in the transmit end in the FlexE group performs clock synchronization with the clock device in the receive end in the FlexE group, one clock synchronization packet may be selected from clock synchronization packets separately carried in the plurality of FlexE instances for clock synchronization.

It should be understood that, that one clock synchronization packet in the clock synchronization packets separately carried in the plurality of FlexE instances is selected for clock synchronization may be that the receive end in the FlexE group selects, based on a clock source algorithm of the receive end, a clock synchronization packet carried in one FlexE instance in the plurality of FlexE instances to perform clock synchronization.

With reference to the first aspect and the foregoing implementations of the first aspect, in another implementation of the first aspect, when the first PHY is faulty, the clock synchronization packet included in the second FlexE instance is the packet used by the first clock device to perform clock synchronization on the second clock device; or when the second PHY is faulty, the clock synchronization packet included in the first FlexE instance is the packet used by the first clock device to perform clock synchronization on the second clock device.

According to the clock synchronization packet sending method, when a PHY for transmission of a clock synchronization packet used by the first clock device to perform clock synchronization with the second clock device is faulty, the receive end may further obtain the clock synchronization packet from FlexE instances transmitted by a PHY that separately transmits the plurality of FlexE instances and that is not faulty, to improve reliability of clock synchronization between the transmit end and the receive end in the FlexE group.

With reference to the first aspect and the foregoing implementations of the first aspect, in another implementation of the first aspect, the first device includes a first clock device, the clock synchronization packet included in the first FlexE instance is a packet used by the first clock device to perform clock synchronization on a second clock device, and the clock synchronization packet included in the second FlexE instance is a packet used by the first clock device to perform clock synchronization on a third clock device.

According to the clock synchronization packet sending method n, there may be a plurality of receiving devices in the receive end in the FlexE group. In addition, because the transmit end in the FlexE group may separately send the plurality of FlexE instances to the receive end in the FlexE group at the plurality of PHYs, even if there are the plurality of receiving devices in the receive end, the plurality of receiving devices may separately receive FlexE instances that carry the clock synchronization packets, so that clock synchronization between the receiving devices and the clock device in the receive end in the FlexE group is implemented.

According to a second aspect, a clock synchronization packet receiving method is provided. The method includes: A second device receives a first flexible Ethernet FlexE instance at a first physical layer PHY. The first FlexE instance includes a clock synchronization packet. The second device receives a second FlexE instance at a second PHY. The second FlexE instance includes a clock synchronization packet, and the first PHY and the second PHY are included in a same FlexE group.

According to the clock synchronization packet receiving method, a receive end (the second device) in the FlexE group receives a plurality of FlexE instances at a plurality of PHYs, and at least two FlexE instances that are in the plurality of FlexE instances and that are sent through at least two PHYs carry the clock synchronization packet. This ensures that the receive end in the FlexE group may obtain the clock synchronization packet from the plurality of the FlexE instances. Even if one PHY is faulty, and a corresponding FlexE instance cannot be transmitted, the receive end may obtain the clock synchronization packet from another FlexE instance in the received plurality of FlexE instances, to improve reliability of clock synchronization between a transmit end and the receive end in the FlexE group.

With reference to the second aspect, in some implementations of the second aspect, the second device includes a second clock device. When the first PHY and the second PHY are in a normal state, the second device adjusts the second clock device based on the clock synchronization packet included in the first FlexE instance or in the second FlexE instance.

According to the clock synchronization packet receiving method, the transmit end in the FlexE group is referred to as a first device, and a clock device in the first device is a first clock device. Similarly, the receive end in the FlexE group may be referred to as the second device, and a clock device in the second device is the second clock device. Specifically, the clock synchronization packets included in the foregoing first FlexE instance and in the second FlexE instance are packets used by the first clock device to perform clock synchronization on the second clock device. Clock synchronization between a clock device in the transmit end in the FlexE group and a clock device in the receive end in the FlexE group is implemented. To be specific, in a case that the transmit end in the FlexE group sends the plurality of FlexE instances to the receive end in the FlexE group at the plurality of PHYs, and all the plurality of PHYs can successfully transmit the plurality of FlexE instances, when a clock device in the transmit end in the FlexE group performs clock synchronization with a clock device in the receive end in the FlexE group, one clock synchronization packet may be selected from clock synchronization packets separately carried in the plurality of FlexE instances for clock synchronization.

With reference to the second aspect and the foregoing implementations of the second aspect, in another implementation of the second aspect, when the first PHY is faulty, the second device adjusts the second clock device based on the clock synchronization packet included in the second FlexE instance; or when the second PHY is faulty, the second device adjusts the second clock device based on the clock synchronization packet included in the first FlexE instance.

According to the clock synchronization packet receiving method, when a PHY for transmission of a clock synchronization packet used by the first clock device to perform clock synchronization with the second clock device is faulty, the receive end may further obtain a clock synchronization packet from a FlexE instance that is transmitted by a PHY that separately transmits the plurality of FlexE instances and that is not faulty, to improve reliability of clock synchronization between the transmit end and the receive end in the FlexE group.

With reference to the second aspect and the foregoing implementations of the second aspect, in another implementation of the second aspect, the second device includes a second clock device and a third clock device. The method further includes: adjusting, by the second device, the second clock device based on the clock synchronization packet included in the first FlexE instance, and adjusting, by the second device, the third clock device based on the clock synchronization packet included in the second FlexE instance; or adjusting, by the second device, the second clock device based on the clock synchronization packet included in the second FlexE instance, and adjusting, by the second device, the third clock device based on the clock synchronization packet included in the first FlexE instance.

According to the clock synchronization packet receiving method, there may be a plurality of receiving devices in the receive end in the FlexE group. In addition, because the transmit end in the FlexE group may separately send the plurality of FlexE instances to the receive end in the FlexE group at the plurality of PHYs, even if there are a plurality of receiving devices in the receive end, the plurality of receiving devices may receive FlexE instances that carry the clock synchronization packets, so that clock synchronization between the receiving devices and the clock device in the receive end in the FlexE group is implemented.

According to a third aspect, a first device is provided. The first device may be configured to perform an operation of the first device in any one of the first aspect or the possible implementations of the first aspect. Specifically, the first device includes a corresponding first circuit and a corresponding second circuit that are configured to perform the steps or functions described in the foregoing first aspect. The steps or functions may be implemented by software, hardware, or a combination of hardware and software.

According to a fourth aspect, a second device is provided. The second device may be configured to perform an operation of the second device in any one of the second aspect or the possible implementations of the second aspect. Specifically, the second device includes a corresponding third circuit and a corresponding fourth circuit that are configured to perform the steps or functions described in the foregoing second aspect. The steps or functions may be implemented by software, hardware, or a combination of hardware and software.

According to a fifth aspect, a device for exchanging a clock synchronization packet is provided, including a processor and a memory. The memory is configured to store a computer program, and the processor is configured to invoke the computer program from the memory and run the computer program, so that the device for exchanging the clock synchronization packet performs the clock synchronization packet sending method in any possible implementation of the first aspect and the clock synchronization packet receiving method in any possible implementation of the second aspect.

According to a sixth aspect, a system is provided. The system includes a first device and a second network device according to the third aspect and the fourth aspect.

According to a seventh aspect, a computer program product is provided. The computer program product includes a computer program (which may also be referred to as code or an instruction). When the computer program is run, a computer is enabled to perform the method according to any one of the possible implementations of the first aspect or the possible implementations of the second aspect.

According to an eighth aspect, a computer-readable medium is provided. The computer-readable medium stores a computer program (which may also be referred to as code or an instruction). When the computer program is run on a computer, the computer is enabled to perform the method according to any one of the possible implementations of the first aspect or the possible implementations of the second aspect.

According to a ninth aspect, a chip system is provided and includes a memory and a processor. The memory is configured to store a computer program, and the processor is configured to invoke the computer program from the memory and run the computer program, to enable a device for exchanging a clock synchronization packet, on which the chip system is installed, to perform the method in any one of the possible implementations of the first aspect or the possible implementations of the second aspect.

Embodiments provide a clock synchronization packet exchanging method and an apparatus. The clock synchronization packet is carried in the plurality of flexible Ethernet FlexE instances transmitted between the transmit end and the receive end in the FlexE group, and the plurality of FlexE instances are transmitted at a plurality of PHYs, so that reliability of clock synchronization between the transmit end and the receive end in the FlexE group can be improved.

DETAILED DESCRIPTION

Figure 1:
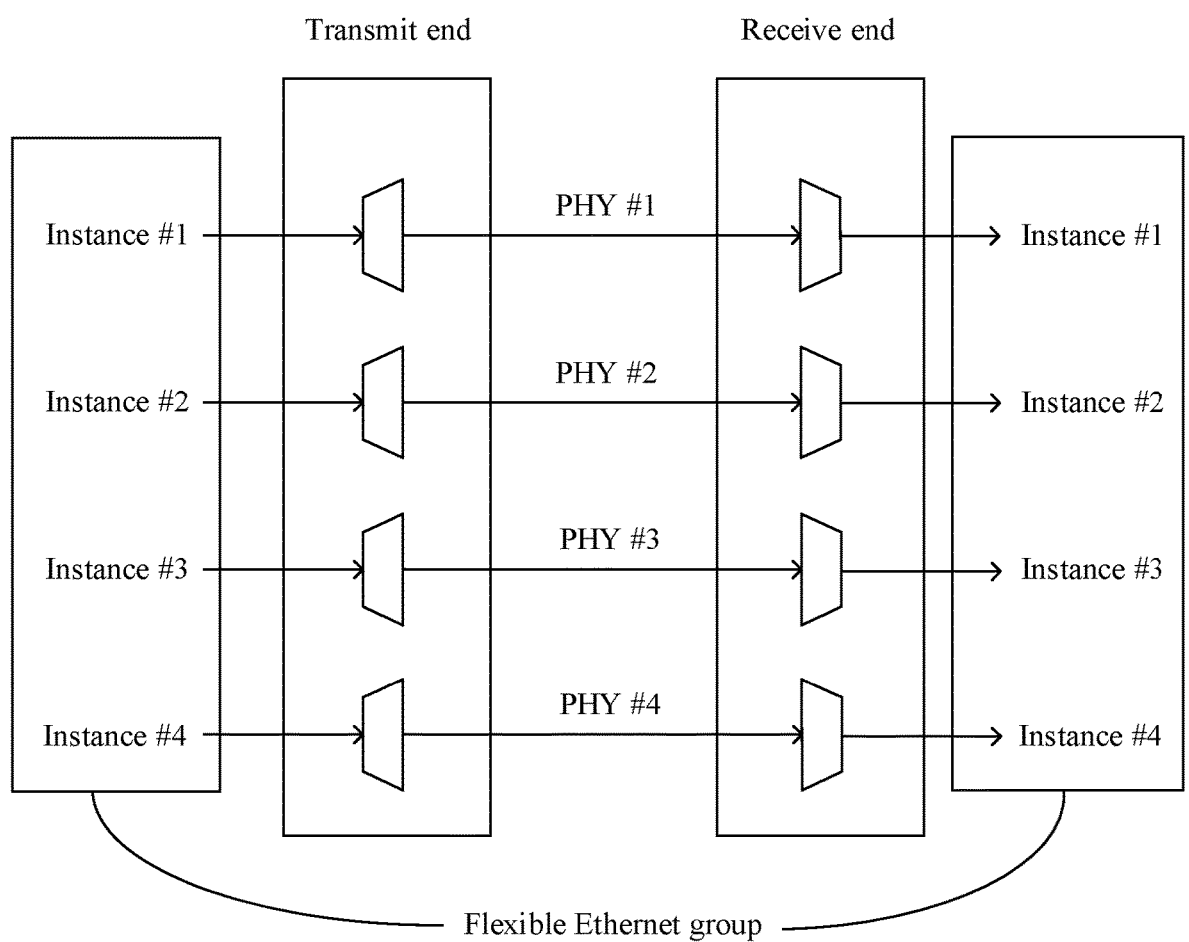
FIG. 1 is a diagram of a scenario to which a clock synchronization packet exchanging method is applicable.

The Ethernet technology has been widely used in the network industry. A FlexE technology is proposed in the industry. For example, the OIF has released the Flex Ethernet 2.0 implementation agreement. On the basis of a conventional Ethernet protocol, a FlexE standard extends a function and flexibility of the Ethernet. The FlexE has a very broad market prospect in low-latency and high-bandwidth scenarios, for example, a 5th generation (5G) system backhaul network and data center interconnection.

A transmission speed of the FlexE may be expressed in a unit of gigabits per second (Gbps). Currently, a FlexE client may correspond to the following rates: a 5 Gbps base reach (SGBASE-R) port, a 10 Gbps base reach (10GbpsBASE-R) port, or a 25 Gbps base reach port (25GBASE-R) port.

A flexible Ethernet client signal may be transmitted through the following Ethernet interfaces: a 100 Gbps base reach (100GBASE-R) Ethernet physical interface, a 200 Gbps base reach (200GBASE-R) Ethernet physical interface, and a 400 Gbps base reach (400GBASE-R) Ethernet physical interface. The flexible Ethernet client signal may also be referred to as a FlexE client. The FlexE client is configured to encapsulate user data, and transmit the data in a data transmission manner defined by a FlexE interface. One FlexE client may carry data flows of one user.

With rapid development of the flexible Ethernet, a concept of a FlexE group is defined in the standard. Specifically, a FlexE group may include a physical layer (PHY). Alternatively, a FlexE group may include a plurality of bonded PHYs. When a FlexE group includes the plurality of PHYs, the PHYs have a same rate. For example, the rate of each PHY may be 100GBASE-R, 200GBASE-R, or 400GBASE-R. Each FlexE group carries one or more FlexE instances. The FlexE instance may refer to a unit of information carrying Ethernet client data (e.g., FlexE client data). For example, a FlexE instance may have a rate of 100 Gbps. The FlexE instance having a rate of 100 Gbps may be referred to as a 100 G FlexE instance. One 100 Gbps PHY may carry one 100 G FlexE instance. One 200 Gbps PHY may carry two 100 G FlexE instances. One 400 Gbps PHY may carry four 100 G FlexE instances. When the FlexE group specified in the existing standard includes a plurality of PHYs, each PHY may be used to transmit at least one FlexE instance. The PHY may also be referred to as a physical layer device. The FlexE 2.0 implementation agreement defines a clock synchronization packet exchanging method, to implement clock synchronization between a transmit end and a receive end in the FlexE group. Specifically, the clock synchronization packet exchanging method indicates that some fields of the first FlexE instance transmitted at the first PHY in the plurality of PHYs included in the FlexE group are used to transmit a clock synchronization packet. If the first FlexE instance is abnormal or the first PHY is faulty, a clock synchronization packet cannot be normally transmitted between the transmit end and the receive end in the FlexE group. In this case, the receive end receives the clock synchronization packet from an interface that is outside the FlexE group and that transmits the clock synchronization packet, and after the clock synchronization packet is normally sent in the FlexE group, the receive end receives the clock synchronization packet again from a PHY that is in the FlexE group and that transmits the clock synchronization packet. Consequently, the transmit end and the receive end in the FlexE group need to perform switching for a plurality of times for clock synchronization when a fault occurs, so that reliability of clock synchronization of FlexE interface transmission is reduced. Therefore, how to improve reliability of clock synchronization between the transmit end and the receive end in the FlexE group becomes an urgent problem to be resolved.

The following describes technical solutions with reference to accompanying drawings.

Figure 2:
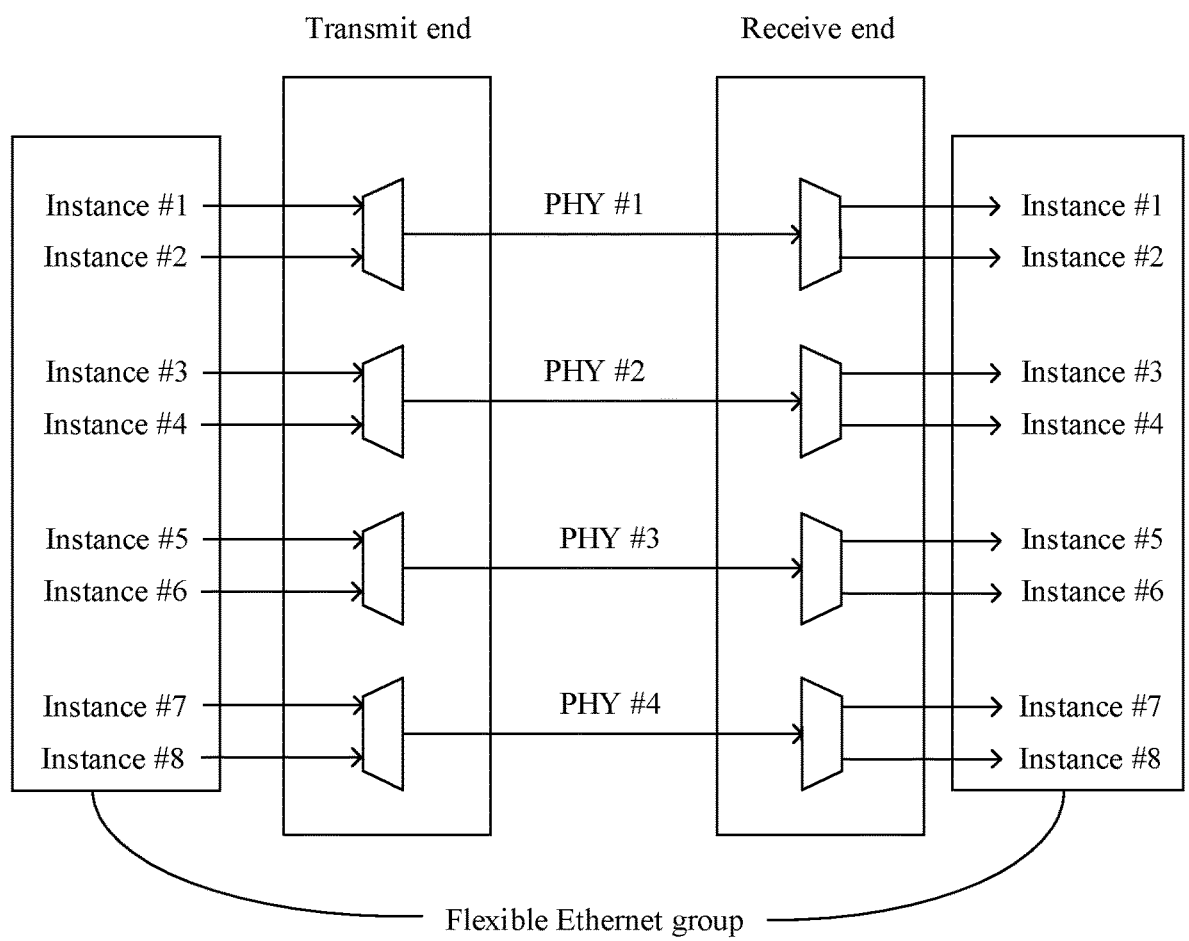
FIG. 2 is diagram of another scenario to which a clock synchronization packet exchanging method is applicable.

The clock synchronization packet exchanging method is mainly applied to a FlexE group specified by an existing agreement. With reference to FIG. 1 and FIG. 2, the following briefly describes a scenario to which the embodiments can be applied.

FIG. 1 is a diagram of a scenario to which a clock synchronization packet exchanging method is applicable. A transmit end and a receive end in a FlexE group and PHYs transmitting FlexE instances are included, and the PHYs transmitting the FlexE instances form the FlexE group.

Specifically, the FlexE group shown in FIG. 1 carries four flexible Ethernet instances (an instance #1 to an instance #4 shown in FIG. 1). Each flexible Ethernet instance is sent by the transmit end to the receive end at a PHY. As shown in FIG. 1, the instance #1 is sent to the receive end at a PHY #1, the instance #2 is sent to the receive end at a PHY #2, the instance #3 is sent to the receive end at a PHY #3, and the instance #4 is sent to the receive end at a PHY #4.

It should be understood that a feature of the flexible Ethernet is to bind a plurality of PHYs to transmit a service with a relatively high media access control (MAC) layer rate. For example, the PHY #1 to the PHY #4 shown in FIG. 1 support a client service of MAC. In other words, the client service is transmitted at the PHY #1 to the PHY #4. The PHY #1 corresponds to a MAC #1 address in the transmit end and a MAC #1' address in the receive end, the PHY #2 corresponds to a MAC #2 address in the transmit end and a MAC #2' address in the receive end, the PHY #3 corresponds to a MAC #3 address in the transmit end and a MAC #3' address in the receive end, and the PHY #4 corresponds to a MAC #4 address in the transmit end and a MAC #4' address in the receive end.

A source MAC address of a packet included in the instance #1 is equal to the MAC #1 address, and a destination MAC address of the packet included in the instance #1 is equal to the MAC #1' address. A source MAC address of a packet included in the instance #2 is equal to the MAC #2 address, and a destination MAC address of the packet included in the instance #2 is equal to the MAC #2' address. A source MAC address of a packet included in the instance #3 is equal to the MAC #3 address, and a destination MAC address of the packet included in the instance #3 is equal to the MAC #3' address. A source MAC address of a packet included in the instance #4 is equal to the MAC #4 address, and a destination MAC address of the packet included in the instance #4 is equal to the MAC #4' address. The following uses a specific example to describe service transmission between the receive end and the transmit end in the FlexE group shown in FIG. 1.

For example, rates of the instance #1 to the instance #4 are all 100 gigabits per second (G), and rates of the PHY #1 to the PHY #4 are all 100 G. The PHY #1 to the PHY #4 are respectively used to transmit the instance #1 to the instance #4.

It should be further understood that FIG. 1 is merely an example, to describe a scenario to which the clock synchronization packet exchanging method is applicable, and constitutes no limitation on this disclosure. For example, the FlexE group shown in FIG. 1 may include X PHYs, where X may be greater than 4.

A case shown in FIG. 1 is that each PHY is used to transmit one FlexE instance. It is specified in the existing standard that each PHY may be used to transmit at least one FlexE instance. In other words, one PHY may transmit a plurality of FlexE instances. The clock synchronization packet exchanging method is also applicable to a scenario in which one PHY transmits a plurality of FlexE instances. In the following, with reference to FIG. 2, an example in which one PHY transmits two FlexE instances is used to briefly describe how one PHY transmits the plurality of FlexE instances.

FIG. 2 is a diagram of another scenario to which a clock synchronization packet exchanging method is applicable. A transmit end and a receive end in a FlexE group and a PHY transmitting a FlexE instance are included, and the PHY transmitting the FlexE instance forms the FlexE group.

Specifically, the FlexE group shown in FIG. 2 carries eight flexible Ethernet instances (an instance #1 to an instance #8 shown in FIG. 2). Every two flexible Ethernet instances are sent by the transmit end to the receive end at a PHY. As shown in FIG. 2, the instance #1 and the instance #2 are sent to the receive end at a PHY #1, the instance #3 and the instance #4 are sent to the receive end at a PHY #2, the instance #5 and the instance #6 are sent to the receive end at a PHY #3, and the instance #7 and the instance #8 are sent to the receive end at a PHY #4.

The PHY #1 to the PHY #4 shown in FIG. 2 support a client service of MAC. In other words, the client service is transmitted at the PHY #1 to the PHY #4. The PHY #1 corresponds to a MAC #1 address and a MAC #2 address in the transmit end and a MAC #1' address and a MAC #2' address in the receive end, the PHY #2 corresponds to a MAC #3 address and a MAC #4 address in the transmit end and a MAC #3' address and a MAC #4' address in the receive end, the PHY #3 corresponds to a MAC #5 address and a MAC #6 address in the transmit end and a MAC #5' address and a MAC #6' address in the receive end, and the PHY #4 corresponds to a MAC #7 address and a MAC #8 address in the transmit end and a MAC #7' address and a MAC #8' address in the receive end.

A source MAC address of a packet included in the instance #1 is equal to the MAC #1 address, and a destination MAC address is equal to the MAC #1' address. A source MAC address of a packet included in the instance #2 is equal to the MAC #2 address, and a destination MAC address is equal to the MAC #2' address. A source MAC address of a packet included in the instance #3 is equal to the MAC #3 address, and a destination MAC address is equal to the MAC #3' address. A source MAC address of a packet included in the instance #4 is equal to the MAC #4 address, and a destination MAC address is equal to the MAC #4' address. A source MAC address of a packet included in the instance #5 is equal to the MAC #5 address, and a destination MAC address is equal to the MAC #5' address. A source MAC address of a packet included in the instance #6 is equal to the MAC #6 address, and a destination MAC address is equal to the MAC #6' address. A source MAC address of a packet included in the instance #7 is equal to the MAC #7 address, and a destination MAC address is equal to the MAC #7' address. A source MAC address of a packet included in the instance #8 is equal to the MAC #8 address, and a destination MAC address is equal to the MAC #8' address. The following uses a specific example to describe service transmission between the receive end and the transmit end in the FlexE group shown in FIG. 2.

For example, rates of the instance #1 to the instance #8 are all 100 G, and rates of the PHY #1 to the PHY #4 are all 200 G. The PHY #1 to the PHY #4 are respectively used to transmit the instance #1 and the instance #2, the instance #3 and the instance #4, the instance #5 and the instance #6, and the instance #7 and the instance #8.

It should be further understood that FIG. 2 is merely an example, to describe a scenario to which the clock synchronization packet exchanging method is applicable, and constitutes no limitation on this disclosure. For example, the FlexE group shown in FIG. 2 may include X PHYs, where X may be greater than 4. For another example, a quantity of FlexE instances transmitted at each PHY shown in FIG. 2 may be greater than 2.

With reference to FIG. 1 and FIG. 2, the following briefly describes scenarios to which the embodiments can be applied, including:

1. The FlexE group includes a plurality of bonded PHYs with a same rate, and the transmit end in the FlexE group sends one FlexE instance to the receive end in the FlexE group at each PHY.

2. The FlexE group includes a plurality of bonded PHYs with a same rate, and the transmit end in the FlexE group sends a plurality of FlexE instances to the receive end in the FlexE group at each PHY.

To facilitate understanding of the clock synchronization packet exchanging method, the following briefly describes several basic concepts in the embodiments.

1. Flexible Ethernet.

The FlexE is an interface technology that a transport network implements service isolation carrying and network slicing, and the FlexE develops rapidly in recent two years and is widely accepted by various main standards organizations. A difference between a structure of the flexible Ethernet and a structure of the conventional Ethernet lies in that, in the flexible Ethernet, there is an FlexE shim between a MAC layer and a physical coding sublayer (PCS). A function of the FlexE shim is to construct a calendar of a size of 20×n clocks whose length is 66 bytes (66 b), where n is a quantity of PHYs bonded to the flexible Ethernet, and each 66 b block represents one slot of 5 G. At the transmit end, services with different MAC rates are carried in corresponding 66 b blocks based on a multiple of 5 G. Every 20 66 b blocks form a sub calendar. The calendar of a size of 20×n is divided into n sub calendars. For each sub calendar, a 66 b overhead is correspondingly added in every 20×1023 66 b blocks to store a corresponding mapping relationship. Each sub calendar is transmitted at a single 100 G PHY. At the receive end, n sub calendars may form a calendar of a size of 20×n, and a corresponding service is extracted from a corresponding quantity of 66 b blocks based on the mapping relationship stored in the overhead.

2. FlexE group: The FlexE group may include one PHY. Alternatively, the FlexE group may include a plurality of bonded PHYs. When a FlexE group includes the plurality of PHYs, the PHYs have a same rate. The PHY may also be referred to as a physical layer device. The transmit end in the FlexE group sends one or more of FlexE instances to the receive end in the FlexE group at one PHY.

The FlexE instance may be a unit carrying a FlexE client, and each FlexE instance may support, for example, a rate of 100 Gbps.

The following briefly describes the FlexE client. A high-speed Ethernet signal transmitted in a transport network may be referred to as the FlexE client. The FlexE client is configured to encapsulate user data, and transmit the data in a data transmission manner defined by a FlexE interface. One FlexE client may carry data flows of one user.

3. Clock Synchronization Packet.

On a synchronization network, frequency synchronization and/or time synchronization need/needs to be achieved between devices. To be specific, a frequency offset and/or a time offset between devices need/needs to be within a specified range. A common method is to exchange clock synchronization packets to achieve the frequency synchronization and/or the time synchronization between the devices. The clock synchronization packet may be information used for clock synchronization, for example, a Precision Time Protocol (PTP) packet, or a synchronous status message (SSM). The PTP is defined in the 1588 protocol. Therefore, the PTP packet is also referred to as a 1588 packet. A specific name of the clock synchronization packet is not limited in the embodiments, and only that the clock synchronization packet is a packet used to implement synchronization between the transmit end and the receive end in the FlexE group is limited.

The FlexE 2.0 implementation agreement defines a solution for implementing synchronization between the transmit end and the receive end in the FlexE group. To be specific, the clock synchronization packet is carried in the first FlexE instance in a plurality of FlexE instances transmitted in the FlexE group. To further understand the clock synchronization packet exchanging method, compared with the solution for implementing synchronization between the transmit end and the receive end in the FlexE group defined in the FlexE 2.0 implementation agreement, the following briefly describes the solution for implementing synchronization between the transmit end and the receive end in the FlexE group defined in the FlexE 2.0 implementation agreement. For ease of description, an example in which the clock synchronization packet is the 1588 packet is used for description, including:

Case 1:

When each of the plurality of PHYs in the FlexE group is used to transmit one FlexE instance, the 1588 packet is carried in a FlexE instance transmitted at the first PHY. Identification information of the first PHY in the plurality of PHYs is known to both the transmit end and the receive end in the FlexE group. In other words, before receiving a FlexE instance sent by the transmit end, the receive end has learned, according to stipulations in the agreement, that in the FlexE group, if the transmit end needs to send the 1588 packet to the receive end, the 1588 packet may be carried only in the FlexE instance transmitted at the first PHY in the plurality of PHYs in the FlexE group.

For example, the instance #1 shown in FIG. 1 carries the 1588 packet, and the transmit end in the FlexE group sends the 1588 packet to the receive end in the FlexE group at the PHY #1.

Case 2:

When each of the plurality of PHYs in the FlexE group is used to transmit a plurality of FlexE instances, the 1588 packet is carried in the first FlexE instance transmitted at the first PHY. Identification information of the first PHY in the plurality of PHYs and identification information of the first FlexE instance transmitted at the first PHY are known to both the transmit end and the receive end in the FlexE group. In other words, before receiving a FlexE instance sent by the transmit end, the receive end has learned, according to stipulations in the agreement, that in the case 2, in the FlexE group, if the transmit end needs to send the 1588 packet to the receive end, the 1588 packet may be carried only in the first FlexE instance transmitted at the first PHY in the plurality of PHYs in the FlexE group.

For example, the instance #1 shown in FIG. 2 carries the 1588 packet, and the transmit end in the FlexE group sends the 1588 packet to the receive end in the FlexE group through the instance #1 transmitted at the PHY #1.

It can be learned from case 1 and case 2 that, in the solution for implementation synchronization between the transmit end and the receive end in the FlexE group specified in the existing agreement, when a FlexE instance that is used to carry the 1588 packet and that is specified in the FlexE group is faulty, and a PHY that transmits a FlexE instance that carries the 1588 packet is faulty, the FlexE group is reassembled to obtain a reassembled FlexE group. In this process, because the foregoing possible fault occurs, after the fault occurs and before the FlexE group is reassembled, no other transmitted FlexE instance in the FlexE group carries the 1588 packet. In this case, the receive end cannot obtain the 1588 packet from a FlexE instance other than the first FlexE instance in the FlexE group transmitted at the first PHY. Therefore, to synchronize with the transmit end, the receive end selects an interface that is not in the FlexE group and that transmits the 1588 packet to receive the 1588 packet. After the FlexE group is reassembled, the receive end receives the 1588 packet again from the first PHY in the reassembled FlexE group. The interface that transmits the 1588 packet may be a PHY interface of the first PHY in another FlexE group with a low priority, a Wi-Fi interface, an optical transport network (OTN) interface, or the like. Priorities of different interfaces that transmit the 1588 packet are pre-agreed between the transmit end and the receive end.

For example, the PHY #1 in the FlexE group shown in FIG. 1 is faulty. Consequently, the 1588 packet cannot be transmitted between the transmit end and the receive end at the PHY #1, and the receive end switches to the interface that is not in the FlexE group and that transmits the 1588 packet to receive the 1588 packet. The FlexE group shown in FIG. 1 is reassembled, PHYs included in the reassembled FlexE group include the PHY #2 to the PHY #4, and the instance #2 that is sent by a transmit end in the reassembled FlexE group to a receive end in the reassembled FlexE group at the PHY #2 carries the 1588 packet. In this case, the receive end switches an interface that receives the 1588 packet again, and receives the 1588 packet at the PHY #2.

Figure 3:
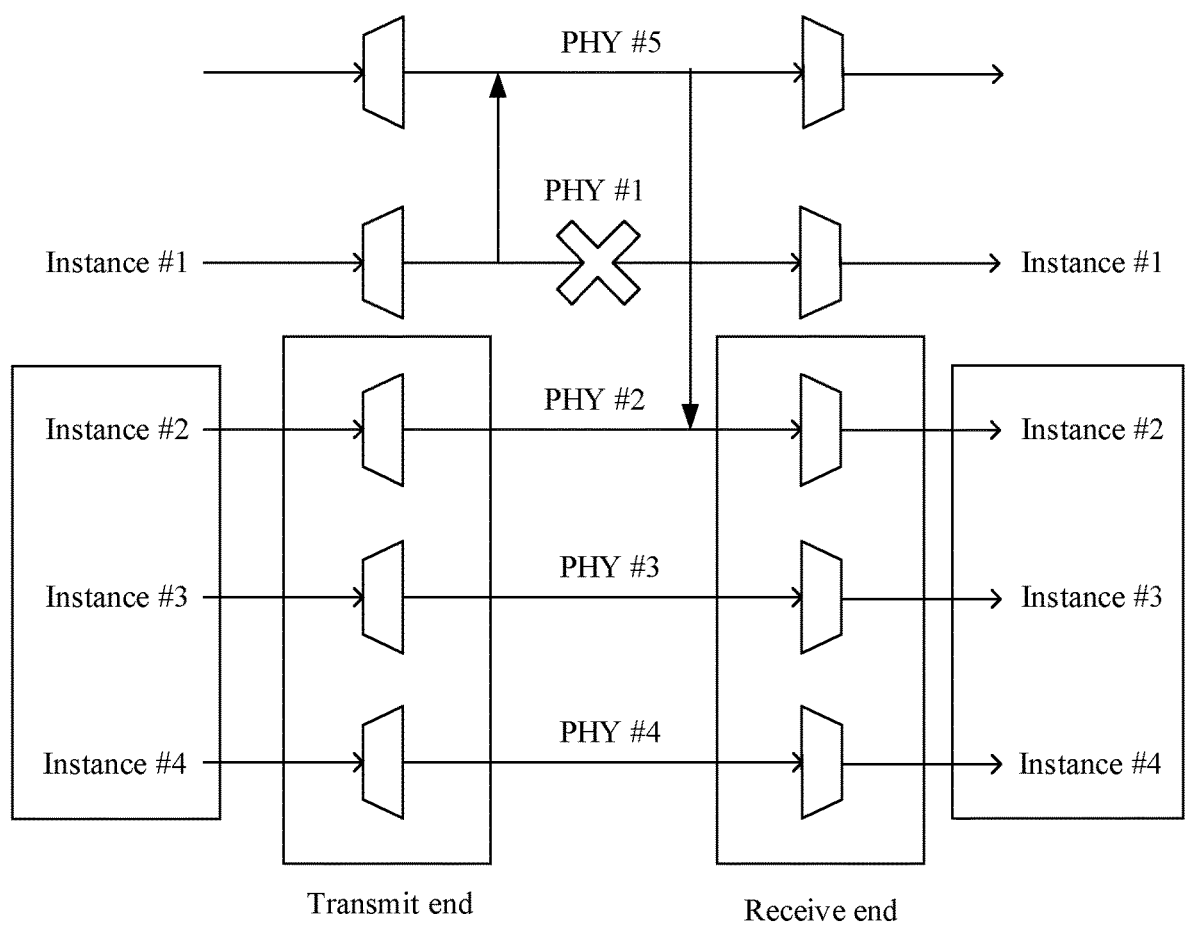
FIG. 3 is a schematic diagram of receiving a 1588 packet by a receive end.

With reference to FIG. 3, how a receive end switches different interfaces to receive a 1588 packet is described.

FIG. 3 is a schematic diagram of receiving the 1588 packet by the receive end. Specifically, as shown in FIG. 3, when a PHY #1 is faulty, a transmit end switches from the PHY #1 to a PHY #5 to receive the 1588 packet. After a FlexE group is reassembled, the PHY #5 is switched to a PHY #2 in a new FlexE group to receive the 1588 packet.

It should be understood that, the receive end switches between different interfaces to receive the 1588 packet because priorities of different interfaces are different. In other words, the receive end selects an interface with a higher priority to receive the 1588 packet. For example, a relationship of priorities of different interfaces shown in FIG. 3 is that: a priority of an interface of a PHY in the FlexE group is higher than a priority of an interface of the PHY #5.

In conclusion, in the solution for implementing the synchronization between the transmit end and the receive end in the FlexE group specified in an existing agreement, when a PHY that is used to transmit the 1588 packet and that is specified in the agreement is faulty, the receive end needs to switch to a different interface to receive the 1588 packet. This reduces reliability of synchronization between the transmit end and the receive end.

Figure 4:
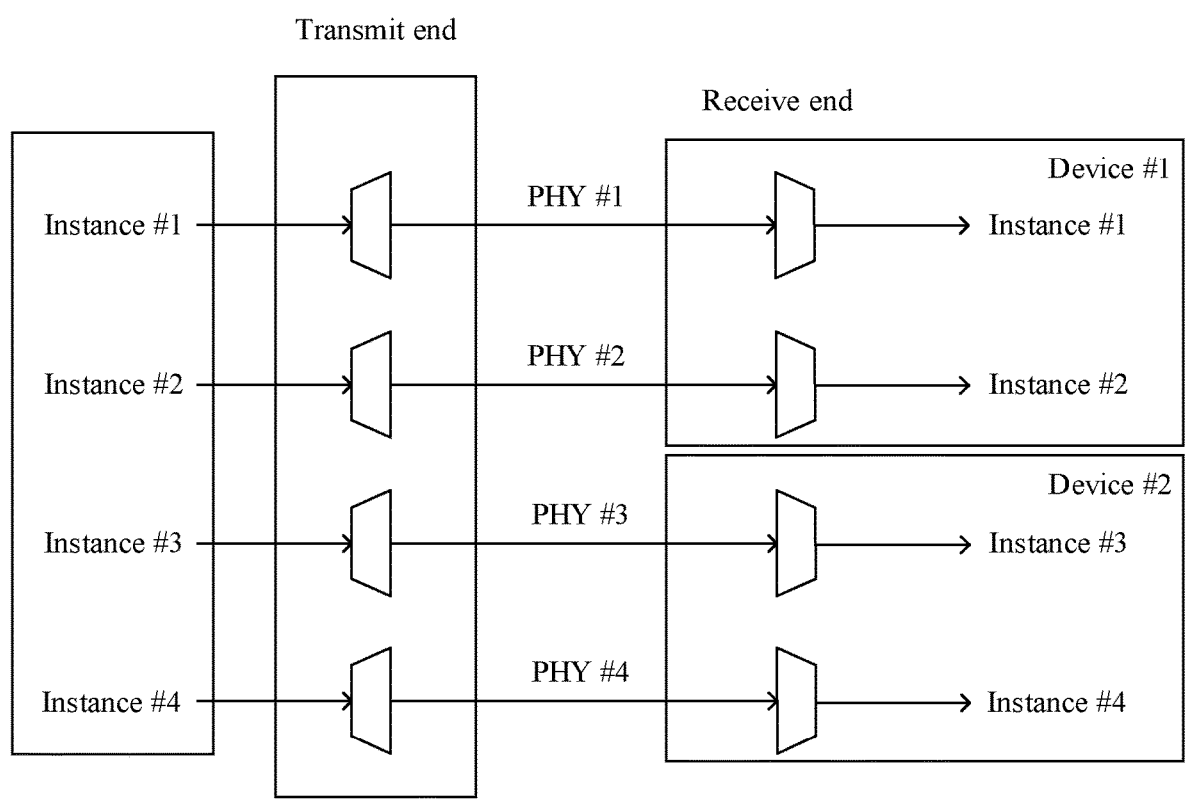
FIG. 4 is another schematic diagram of receiving a 1588 packet by a receive end.

Further, when there are two receiving devices at the receive end, only a receiving device that receives the first FlexE instance can obtain the 1588 packet. As shown in FIG. 4, when the receive end includes two devices (a device #1 and a device #2 shown in FIG. 4), the device #1 can receive, at the PHY #1 and the PHY #2, a packet sent by the transmit end, and the device #2 can receive, at the PHY #3 and the PHY #4, the packet sent by the transmit end. Because in the solution for implementing synchronization between the transmit end and the receive end in the FlexE group specified by the existing agreement, the transmit end can send the 1588 packet to the receive end only through the first FlexE instance transmitted at the PHY #1. Therefore, only the device #1 can receive the 1588 packet at the PHY #1. In other words, in FIG. 4, only the device #1 can receive the 1588 packet, and the device #2 cannot receive the 1588 packet.

To resolve a disadvantage in the solution for implementing synchronization between the transmit end and the receive end shown in FIG. 3 and FIG. 4, this disclosure provides a clock synchronization packet exchanging method, to improve reliability of clock synchronization between a transmit end and a receive end in a FlexE group. The following describes in detail, from a perspective of interaction between the transmit end and the receive end in the FlexE group with reference to FIG. 5 to FIG. 9, the clock synchronization packet exchanging method.

Figure 5:
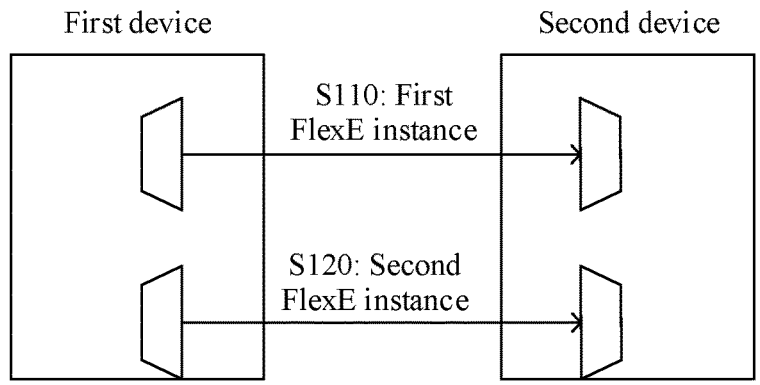
FIG. 5 is a schematic diagram of a clock synchronization packet exchanging method.

FIG. 5 is a schematic diagram of a clock synchronization packet exchanging method. The method is applied in a FlexE group, including a first device, a second device, and steps S110 and S120. The FlexE group includes a first PHY and a second PHY.

S110: The first device sends a first FlexE instance at the first PHY.

The first FlexE instance includes a clock synchronization packet, and the clock synchronization packet is used to perform clock synchronization between the first device and the second device. Specifically, after encapsulating the clock synchronization packet in a preset encapsulation manner, the first device inserts an encapsulated clock synchronization packet into a clock synchronization packet storage area in an overhead of the first FlexE instance, and a first synchronization configuration SC bit value in the overhead of the first FlexE instance is set to 1. That the first SC bit value is 1 indicates that the first FlexE instance includes the clock synchronization packet. The overhead of the first FlexE instance is an overhead of a FlexE instance specified in the existing agreement, and an overhead format of the FlexE instance is not limited in this embodiment. Details are not described herein.

After receiving the first FlexE instance, the second device can determine, based on the SC in the overhead of the first FlexE instance, that the first FlexE instance carries the clock synchronization packet, then obtain, through parsing, the encapsulated clock synchronization packet from the clock synchronization packet storage area in the overhead of the first FlexE instance, and finally obtain the clock synchronization packet from the encapsulated clock synchronization packet in a preset decapsulation manner.

S120: The first device sends a second FlexE instance at the second PHY.

The second FlexE instance includes a clock synchronization packet, and the clock synchronization packet is used to perform clock synchronization between the first device and the second device. Specifically, after encapsulating the clock synchronization packet in a preset encapsulation manner, the first device inserts an encapsulated clock synchronization packet into a clock synchronization packet storage area in an overhead of the second FlexE instance, and a second synchronization configuration SC bit value in the overhead of the second FlexE instance is set to 1. That the second SC bit value is 1 indicates that the second FlexE instance includes the clock synchronization packet. The overhead of the second FlexE instance is an overhead of the FlexE instance specified in the existing agreement, and an overhead format of the FlexE instance is not limited in this embodiment. Details are not described herein.

After receiving the second FlexE instance, the second device can determine, based on the SC in the overhead of the second FlexE instance, that the second FlexE instance carries the clock synchronization packet, then obtain, through parsing, the encapsulated clock synchronization packet from the clock synchronization packet storage area in the overhead of the second FlexE instance, and finally obtain the clock synchronization packet from the encapsulated clock synchronization packet in the preset decapsulation manner.

The second device may be one device, or may be a device including a first sub-device and a second sub-device. The following cases are included:

Case 1:

The second device is one device.

For example, the second device obtains both the clock synchronization packet carried in the first FlexE instance and the clock synchronization packet carried in the second FlexE instance. For example, the first device further includes a first clock device, and the second device further includes a second clock device, and the clock synchronization packets included in the first FlexE instance and in the second FlexE instance are packets used by the first clock device to perform clock synchronization on the second clock device. To be specific, when the first PHY and the second PHY are in a normal state, the second device selects, by using a clock source algorithm in the second device and based on the clock synchronization packet carried in the received first FlexE instance and the clock synchronization packet carried in the received second FlexE instance, the clock synchronization packet included in the first FlexE instance or the clock synchronization packet included in the second FlexE instance as the packet used by the first clock device to perform clock synchronization on the second clock device.

It should be understood that the clock source algorithm in the second device is not limited in this embodiment. The second device may randomly select, based on the clock source algorithm, one clock synchronization packet from clock synchronization packets included in the first FlexE instance and in the second FlexE instance as the packet used by the first clock device to perform clock synchronization on the second clock device.

For example, when the first PHY is faulty, the clock synchronization packet included in the second FlexE instance is the packet used by the first clock device to perform clock synchronization on the second clock device; or when the second PHY is faulty, the clock synchronization packet included in the first FlexE instance is the packet used by the first clock device to perform clock synchronization on the second clock device.

It may be understood that before the first PHY or the second PHY is faulty, the second device obtains both the clock synchronization packet carried in the first FlexE instance and the clock synchronization packet carried in the second FlexE instance. In this case, the second device may select, based on the clock source algorithm of the second device, the clock synchronization packet included in the first FlexE instance as the packet used by the first clock device to perform clock synchronization on the second clock device, and use the clock synchronization packet included in the second FlexE instance as a backup. When the first PHY is faulty, the second device cannot obtain the clock synchronization packet carried in the first FlexE instance, and may use the clock synchronization packet included in the second FlexE instance as the packet used by the first clock device to perform clock synchronization on the second clock device. Alternatively, the second device may select, based on the clock source algorithm of the second device, the clock synchronization packet included in the second FlexE instance as the packet used by the first clock device to perform clock synchronization on the second clock device, and use the clock synchronization packet included in the first FlexE instance as a backup. When the second PHY is faulty, the second device cannot obtain the clock synchronization packet carried in the second FlexE instance, and may use the clock synchronization packet included in the first FlexE instance as the packet used by the first clock device to perform clock synchronization on the second clock device.

In conclusion, in case 1, the second device may select, based on the clock source algorithm of the second device and from a plurality of FlexE instances that carry the clock synchronization packet, a clock synchronization packet carried in any FlexE instance as the packet used by the first clock device to perform clock synchronization on the second clock device, and select a clock synchronization packet carried in another FlexE instance as the backup. When transmission of the selected FlexE instance is faulty (for example, a PHY for transmitting the FlexE instance is faulty), the second device may randomly select one clock synchronization packet from a plurality of backups as the packet used by the first clock device to perform clock synchronization on the second clock device.

Case 2:

The second device includes the first sub-device and the second sub-device.

For example, the first sub-device obtains the clock synchronization packet carried in the first FlexE instance, and the second sub-device obtains the clock synchronization packet carried in the second FlexE instance. For example, the first device includes the first clock device, the first sub-device includes the second clock device, and the second sub-device includes a third clock device. The clock synchronization packet included in the first FlexE instance is the packet used by the first clock device to perform clock synchronization on the second clock device, and the clock synchronization packet included in the second FlexE instance is a packet used by the first clock device to perform clock synchronization on the third clock device. Alternatively, the clock synchronization packet included in the second FlexE instance is the packet used by the first clock device to perform clock synchronization on the second clock device, and the clock synchronization packet included in the first FlexE instance is a packet used by the first clock device to perform clock synchronization on the third clock device.

In conclusion, in case 2, any sub-device in the second device may select, from a plurality of received FlexE instances that carry the clock synchronization packet based on a clock source algorithm of the sub-device, a clock synchronization packet carried in any FlexE instance as the packet for performing clock synchronization on the second clock device, and select a clock synchronization packet carried in another FlexE instance as the backup. When transmission of the selected FlexE instance is faulty (for example, a PHY for transmitting the FlexE instance is faulty), the sub-device may randomly select one clock synchronization packet from a plurality of backups as the packet used by the first clock device to perform clock synchronization on the second clock device.

It should be understood that, as shown in FIG. 5, the first device sends the first FlexE instance to the second device at the first PHY, and the first device sends the second FlexE instance to the second device at the second PHY. That the first FlexE instance and the second FlexE instance carry the clock synchronization packets is merely an example. In an actual application, a FlexE group to which the first device and the second device belong in the clock synchronization packet exchanging method may include a plurality of bonded PHYs, and the first device may send FlexE instances to the second device through at least two PHYs in more than two PHYs. When the first device sends a plurality of FlexE instances to the second device in a time division multiplexing manner at one PHY, one or more of the plurality of FlexE instances may be selected to carry the clock synchronization packet.

It should be further understood that, when the second device includes a plurality of sub-devices, it needs to be ensured that at least one FlexE instance in FlexE instances received by each sub-device carries the clock synchronization packet. With reference to specific embodiments, the following describes application of the clock synchronization packet exchanging method in different scenarios.

Case 1:

The foregoing second device is one device.

It is assumed that the first device is the transmit end shown in FIG. 1, and the second device is the receive end shown in FIG. 1. When the clock synchronization packet exchanging method shown in FIG. 5 is applied to the scenario shown in FIG. 1, a first configuration module may be disposed in the FlexE group. The first configuration module is configured to randomly select at least two PHYs from the PHY #1 to the PHY #4 shown in FIG. 1. The first device sends at least two FlexE instances to the second device through at least two PHYs selected by the first configuration module, and transmits one FlexE instance at one PHY, where the at least two FlexE instances both carry the clock synchronization packets. Specifically, the first configuration module may be understood as a switch that controls a plurality of PHYs in the FlexE group. If the switch is on, the first device may transmit the clock synchronization packet at the PHY. Otherwise, the first device cannot transmit the clock synchronization packet at the PHY.

Figure 6A:
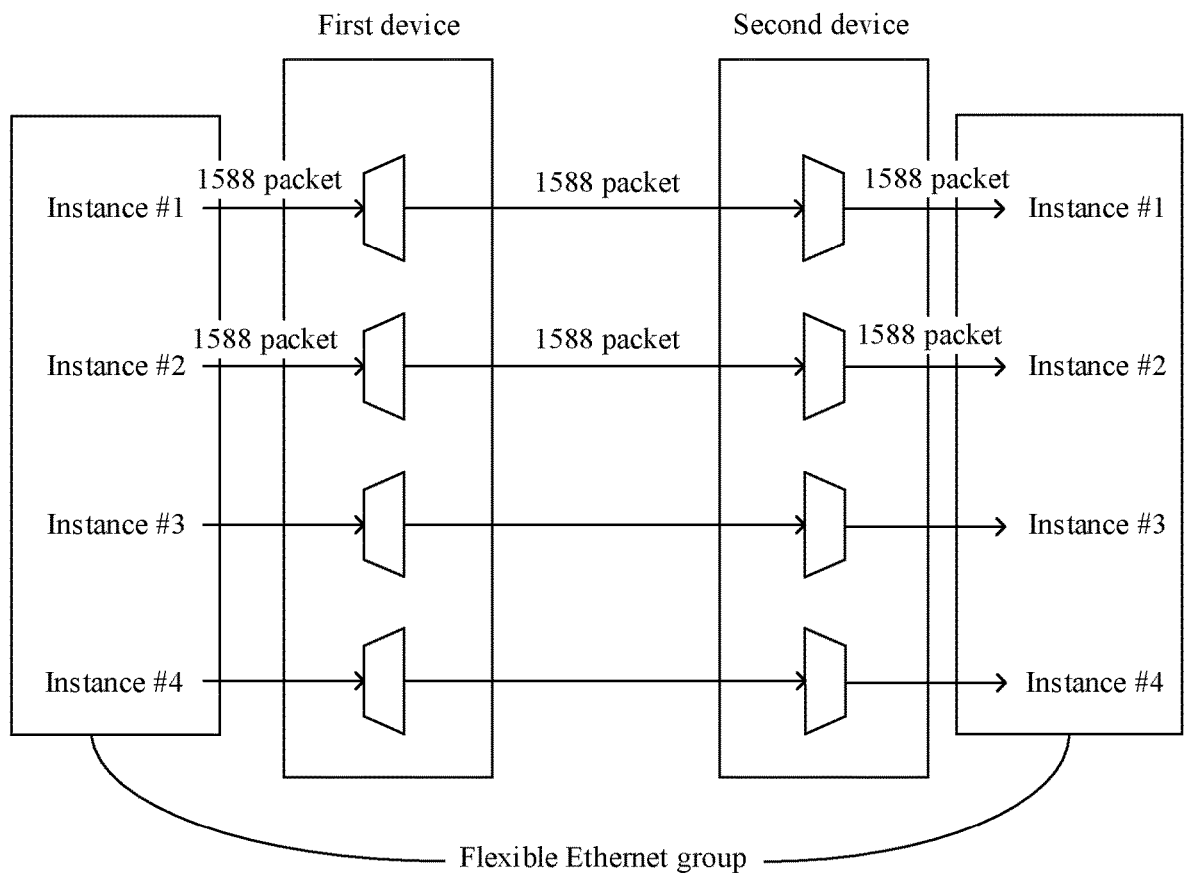
FIG. 6A and FIG. 6B are a schematic diagram of a specific embodiment of exchanging a clock synchronization packet.
Figure 6B:
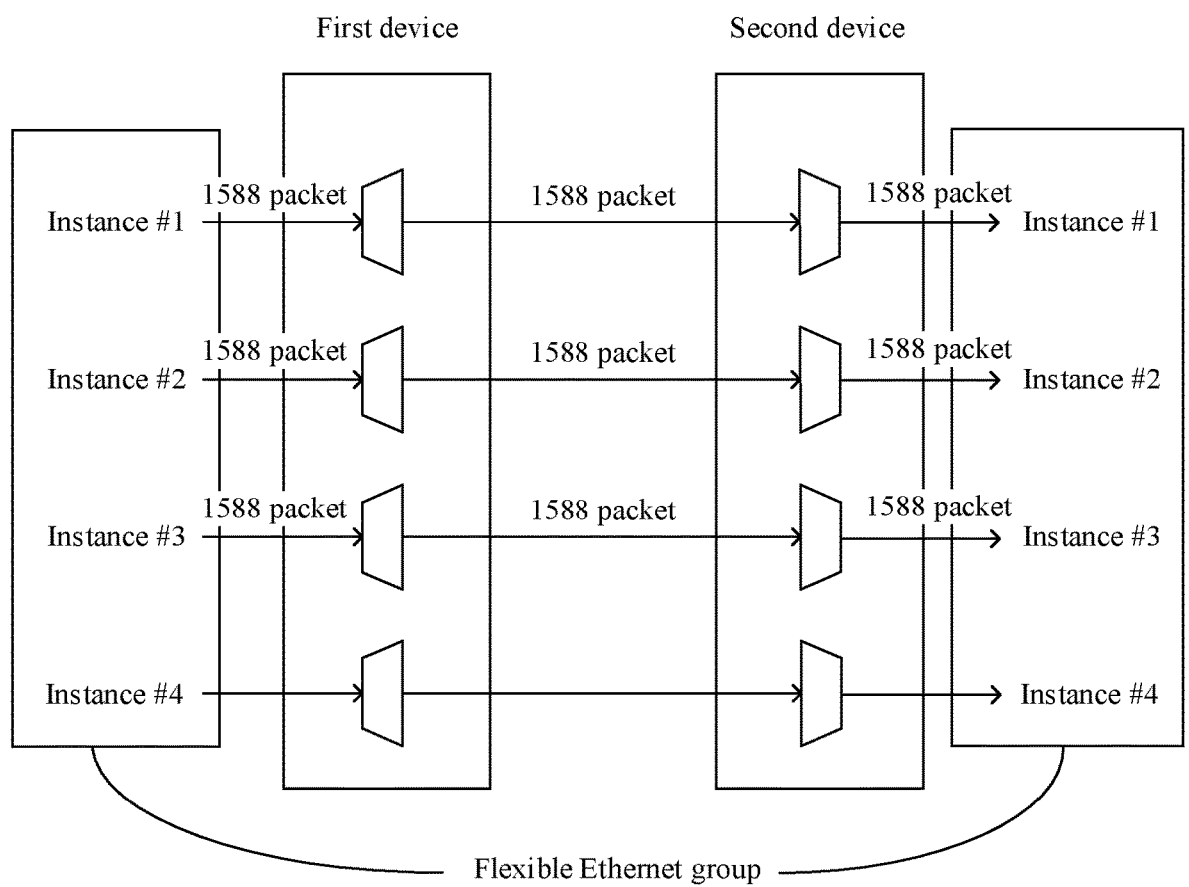

For example, the clock synchronization packet is a 1588 packet. As shown in FIG. 6A, an instance #1 that is sent by the transmit end in FIG. 1 to the receive end in FIG. 1 at the PHY #1 carries a 1588 packet, and an instance #2 that is sent by the transmit end to the receive end at the PHY #2 carries a 1588 packet. Alternatively, as shown in FIG. 6B, an instance #1 sent by the transmit end in FIG. 1 to the receive end in FIG. 1 at the PHY #1 carries a 1588 packet, an instance #2 sent by the transmit end to the receive end at the PHY #2 carries a 1588 packet, and an instance #3 sent by the transmit end to the receive end at the PHY #3 carries a 1588 packet.

It should be understood that FIG. 6 is merely an example. According to the clock synchronization packet exchanging method, when the second device is one device, the first device sends N FlexE instances to the second device at N PHYs. When the first device sends one FlexE instance to the second device at each PHY, only that at least two FlexE instances in the N FlexE instances carry the clock synchronization packets is limited, where N is an integer greater than 1.

It is assumed that the first device is the transmit end shown in FIG. 2, and the second device is the receive end shown in FIG. 2. When the clock synchronization packet exchanging method shown in FIG. 5 is applied to the scenario shown in FIG. 2, a first configuration module may be disposed in the FlexE group and a second configuration module may be disposed on each PHY. The first configuration module is configured to randomly select at least two PHYs from the PHY #1 to the PHY #4 shown in FIG. 2, and the second configuration module is configured to select at least one FlexE instance from FlexE instances that can be transmitted by each PHY to carry the clock synchronization packets. After selection of the first configuration module and the second configuration module, the first device sends at least two FlexE instances to the second device through the at least two PHYs selected by the first configuration module, and the at least two FlexE instances both carry the clock synchronization packets. Specifically, the first configuration module may be understood as the switch that controls the plurality of PHYs in the FlexE group. If the switch is on, the first device may transmit the clock synchronization packet at the PHY. Otherwise, the first device cannot transmit the clock synchronization packet at the PHY. The second configuration module may be understood as a switch that controls a plurality of FlexE instances at each PHY. If the switch is on, the FlexE instance can carry the clock synchronization packet. Otherwise, the FlexE instance is forbidden to carry the clock synchronization packet.

Figure 7A:
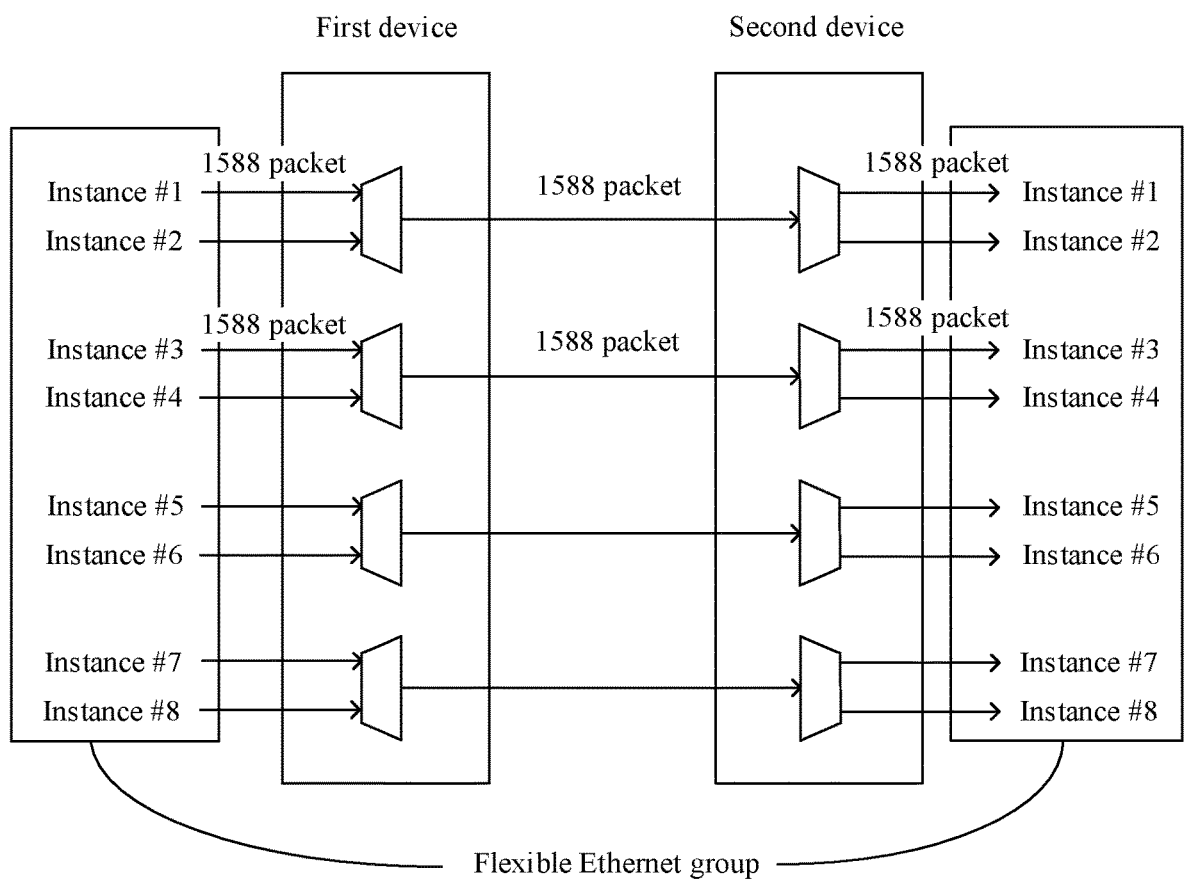
FIG. 7A and FIG. 7B are a schematic diagram of another specific embodiment of exchanging a clock synchronization packet.
Figure 7B:
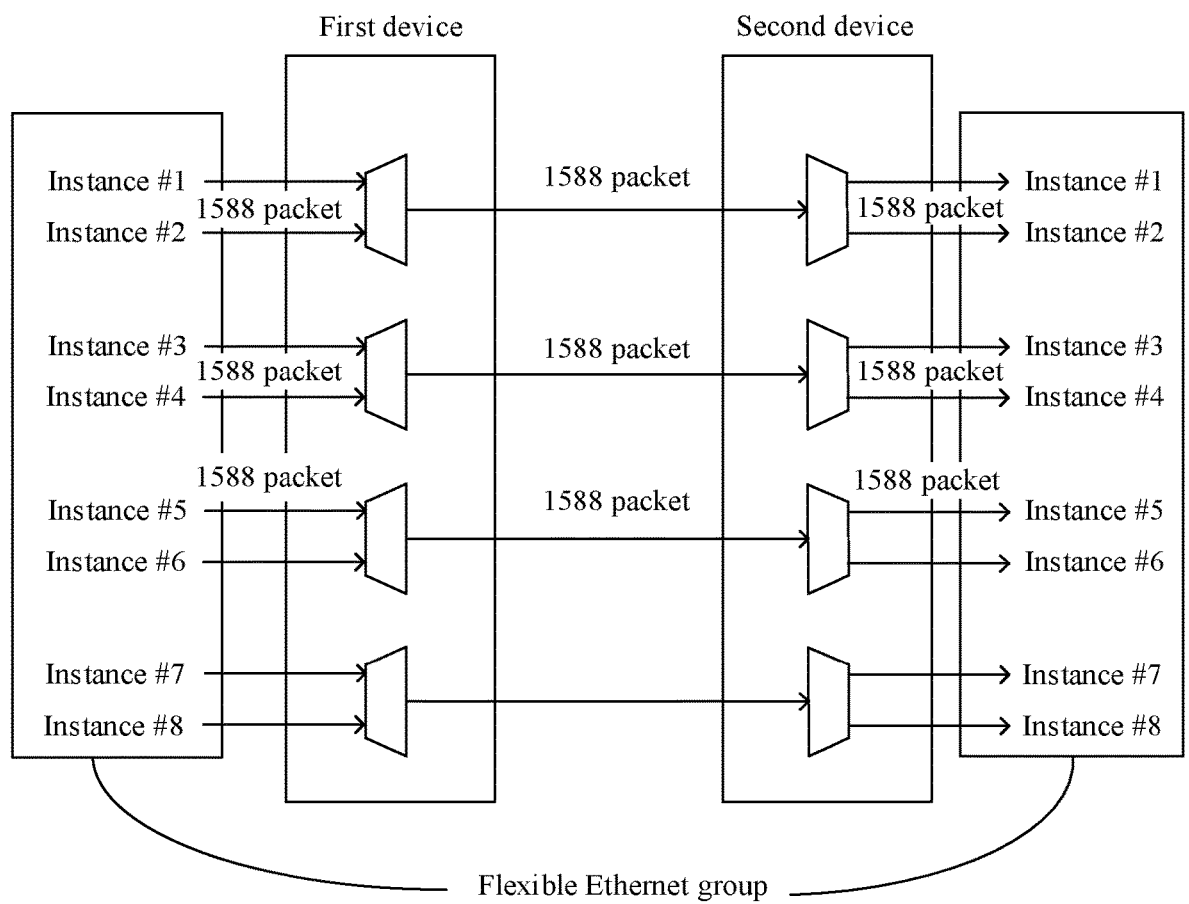

For example, the clock synchronization packet is the 1588 packet. As shown in FIG. 7A, an instance #1 that is sent by the transmit end in FIG. 2 to the receive end in FIG. 2 at the PHY #1 carries a 1588 packet, and an instance #3 that is sent by the transmit end to the receive end at the PHY #2 carries a 1588 packet. Alternatively, as shown in FIG. 7B, an instance #2 sent by the transmit end in FIG. 2 to the receive end in FIG. 2 at the PHY #1 carries a 1588 packet, an instance #4 sent by the transmit end to the receive end at the PHY #2 carries a 1588 packet, and an instance #5 sent by the transmit end to the receive end at the PHY #3 carries a 1588 packet.

It should be understood that FIG. 7 is merely an example. According to the clock synchronization packet exchanging method, when the second device is one device, and the first device sends a plurality of FlexE instances to the second device at N PHYs, only that in a plurality of FlexE instances that is sent by the first device sends to the second device through at least two PHYs in the N PHYs, and in a plurality of FlexE instances that is transmitted at each PHY in the at least two PHYs, at least one FlexE instance carries the clock synchronization packet is limited, where N is an integer greater than 1.

Case 2:

The foregoing second device includes the first sub-device and the second sub-device.

It is assumed that the first device is the transmit end shown in FIG. 1, and the first sub-device and the second sub-device are the receive ends shown in FIG. 1. The first sub-device may receive, at the PHY #1 and the PHY #2, a packet sent by the first device, and the second sub-device may receive at the PHY #3 and the PHY #4, the packet sent by the first device. When the clock synchronization packet exchanging method shown in FIG. 5 is applied to the scenario shown in FIG. 1, a first configuration module may be disposed in the FlexE group. The first configuration module is configured to randomly select one PHY from the PHY #1 and the PHY #2 shown in FIG. 1. The first device sends a FlexE instance to the first sub-device at the PHY selected by the first configuration module, and the FlexE instance carries the clock synchronization packets. The first configuration module is configured to randomly select one PHY from the PHY #3 and the PHY #4 shown in FIG. 1. The first device sends the FlexE instance to the second sub-device at the PHY selected by the first configuration module, and the FlexE instance carries the clock synchronization packet. Specifically, the first configuration module may be understood as a switch that can separately control a plurality of PHYs in the FlexE group in a case that each of a plurality of devices of the receive end may receive a packet sent by the transmit end at the plurality of PHYs. If the switch is on, the device may receive the clock synchronization packet at the PHY. Otherwise, the device cannot transmit the clock synchronization packet at the PHY.

Figure 8A:
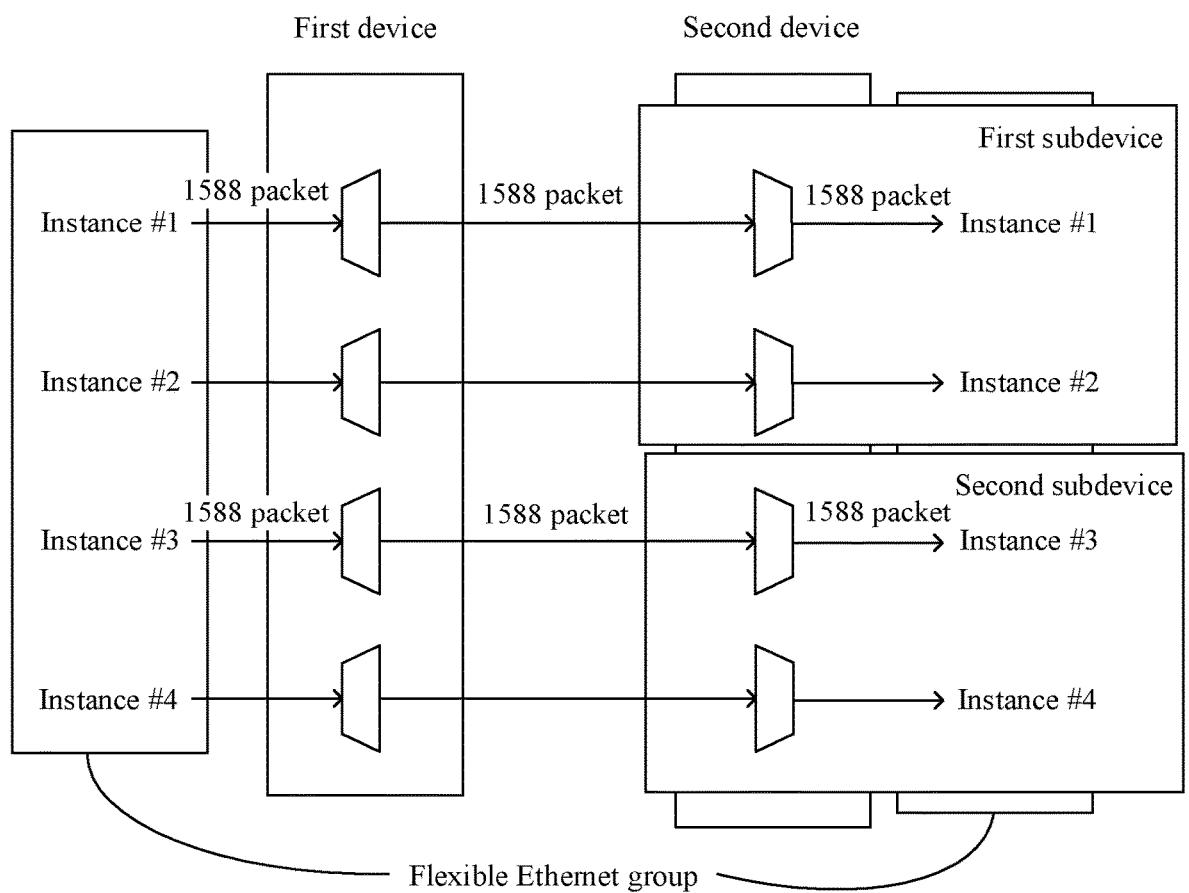
FIG. 8A and FIG. 8B are a schematic diagram of still another specific embodiment of exchanging a clock synchronization packet.
Figure 8B:
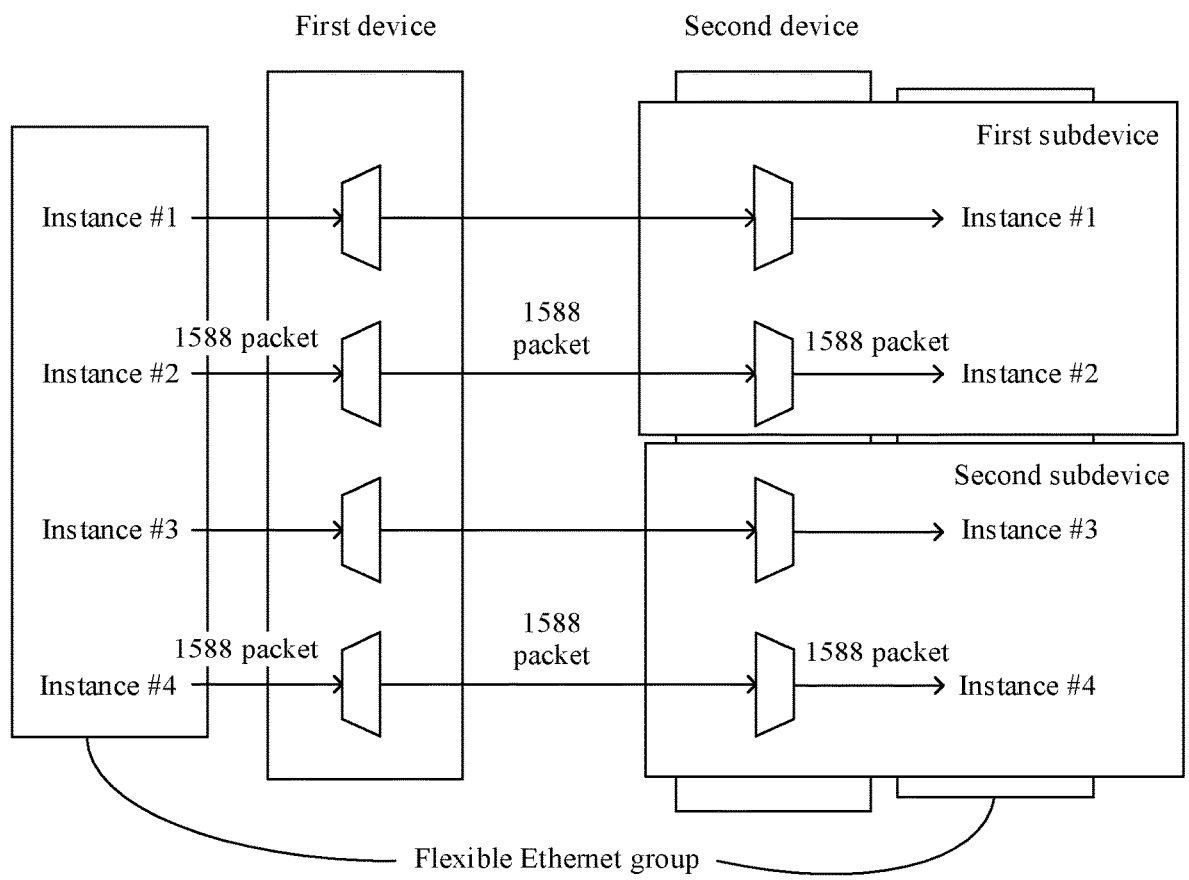

For example, the clock synchronization packet is the 1588 packet. As shown in FIG. 8A, an instance #1 that is sent by the transmit end in FIG. 1 to the receive end in FIG. 1 at the PHY #1 carries a 1588 packet, and an instance #3 that is sent by the transmit end to the receive end at the PHY #3 carries a 1588 packet. Alternatively, as shown in FIG. 8B, an instance #2 sent by the transmit end in FIG. 1 to the receive end in FIG. 1 at the PHY #2 carries a 1588 packet, an instance #4 sent by the transmit end to the receive end at the PHY #4 carries a 1588 packet.

It should be understood that FIG. 8 is merely an example. According to the clock synchronization packet exchanging method, when the second device includes M sub-devices, the first device sends N FlexE instances to the second device at N PHYs, and each sub-device in the M sub-devices may receive the FlexE instance sent by the first device through at least one PHY. When the first device sends one FlexE instance to the second device at each PHY, the first device selects at least M PHYs in the N PHYs, and separately sends FlexE instances to the M sub-devices at the M PHYs. The FlexE instance carries the clock synchronization packet, to ensure that at least one FlexE instance received by the M sub-devices carries the clock synchronization packet, where N and M are integers greater than 1.

It is alternatively assumed that the first device is the transmit end shown in FIG. 2, and the first sub-device and the second sub-device are the receive ends shown in FIG. 2. The first sub-device may receive, at the PHY #1 and the PHY #2, a packet sent by the first device, and the second sub-device may receive, at the PHY #3 and the PHY #4, the packet sent by the first device. When the clock synchronization packet exchanging method shown in FIG. 5 is applied to the scenario shown in FIG. 2, a first configuration module may be disposed in the FlexE group and a second configuration module may be disposed on each PHY. The first configuration module is configured to randomly select one PHY from the PHY #1 and the PHY #2 shown in FIG. 2, and the first configuration module is configured to randomly select one PHY from the PHY #3 and the PHY #4 shown in FIG. 2. The second configuration module is configured to randomly select at least one FlexE instance from FlexE instances that can be transmitted at each PHY, to carry the clock synchronization packet. After selection of the first configuration module and the second configuration module, at least one FlexE instance that is sent by the first device to the first sub-device at the PHY selected by the first configuration module carries the clock synchronization packets, and at least one FlexE instance that is sent by the first device to the second sub-device at the PHY selected by the first configuration module carries the clock synchronization packet. Specifically, the first configuration module may be understood as a switch that controls a plurality of PHYs in the FlexE group in a case that each of a plurality of devices in the receive end may receive a packet sent by the transmit end at the plurality of PHYs. If the switch is on, the device may receive the clock synchronization packet at the PHY. Otherwise, the device cannot receive the clock synchronization packet at the PHY. The second configuration module may be understood as a switch that controls a plurality of FlexE instances at each PHY. If the switch is on, the FlexE instance can carry the clock synchronization packet. Otherwise, the FlexE instance is forbidden to carry the clock synchronization packet.

Figure 9A:
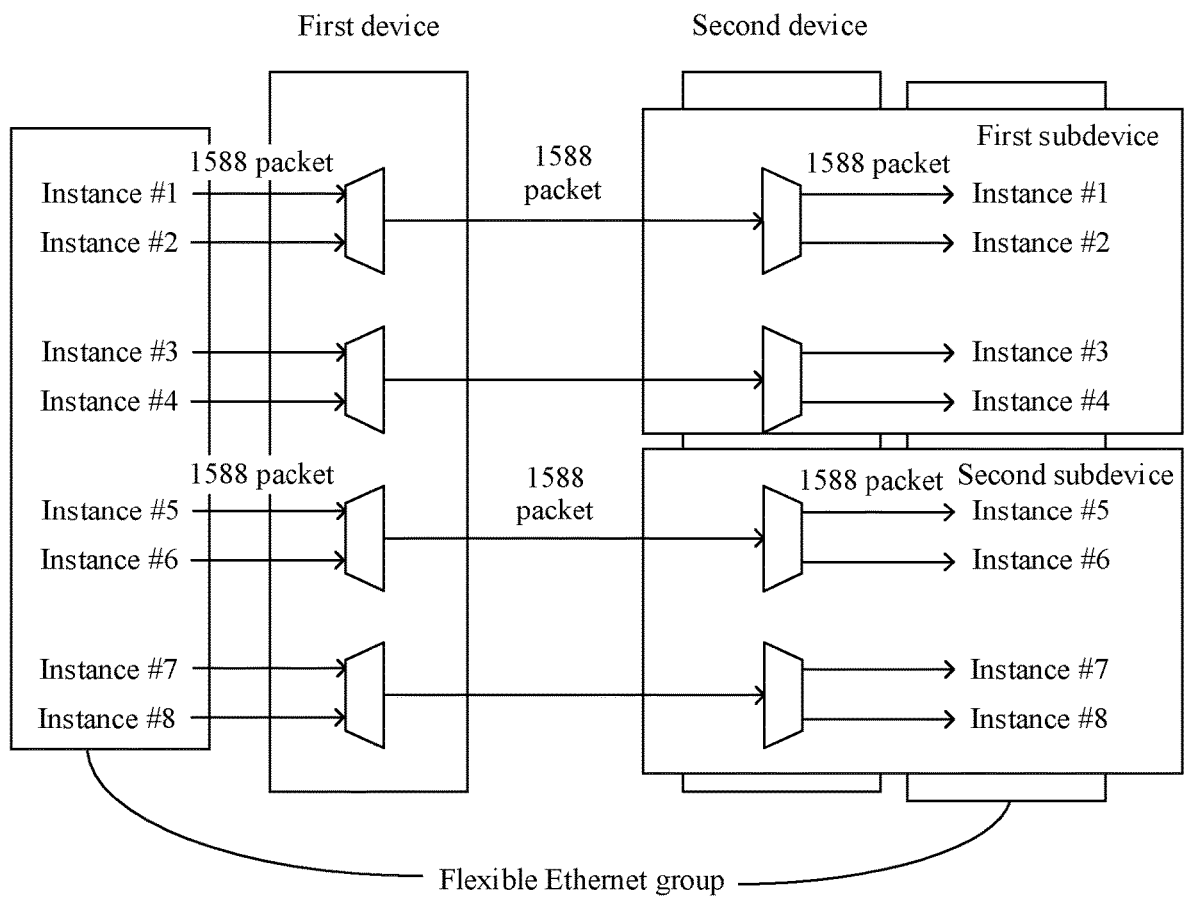
FIG. 9A and FIG. 9B are a schematic diagram of yet another specific embodiment of exchanging a clock synchronization packet.
Figure 9B:
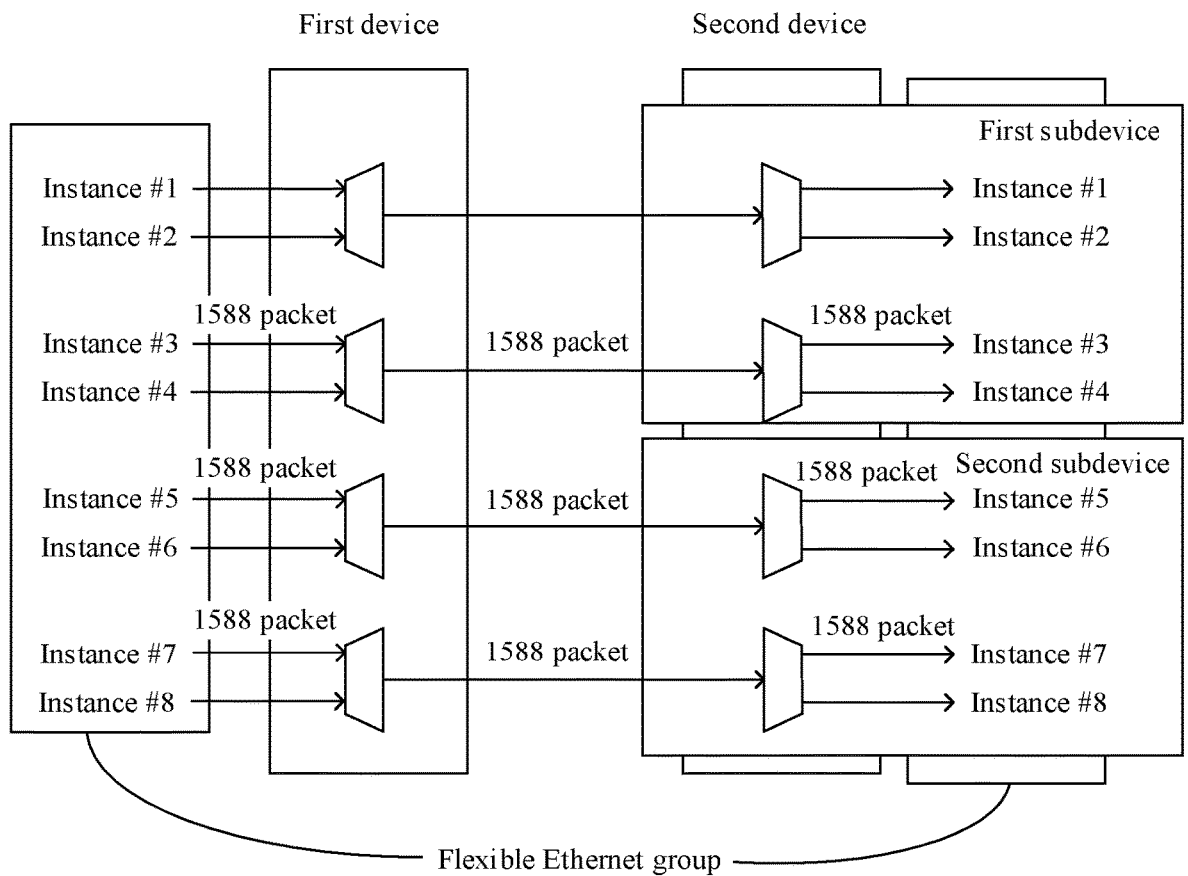

For example, the clock synchronization packet is the 1588 packet. As shown in FIG. 9A, an instance #1 that is sent by the transmit end in FIG. 2 to the receive end in FIG. 2 at the PHY #1 carries a 1588 packet, and an instance #3 that is sent by the transmit end to the receive end at the PHY #3 carries a 1588 packet. Alternatively, as shown in FIG. 9B, an instance #3 sent by the transmit end in FIG. 1 to the receive end in FIG. 1 at the PHY #2 carries a 1588 packet, an instance #5 sent by the transmit end to the receive end at the PHY #3 carries a 1588 packet, and an instance #7 sent by the transmit end to the receive end at the PHY #4 carries a 1588 packet.

It should be understood that FIG. 9 is merely an example. According to the clock synchronization packet exchanging method, when the second device includes M sub-devices, the first device sends N FlexE instances to the second device at N PHYs, and each sub-device in the M sub-devices may receive the FlexE instances sent by the first device through at least one PHY. When the first device sends a plurality of FlexE instances to the second device at each PHY, only that at least one FlexE instance in the plurality of FlexE instances received by each of the M sub-devices through the at least one PHY carries the clock synchronization packet is limited, where N and M are integers greater than 1.

It should be further understood that it is merely an example that the foregoing scenarios in FIG. 1 and FIG. 2 to which the clock synchronization packet exchanging method shown in FIG. 5 is applicable and constitutes no limitation on this disclosure.

It should be further understood that, without considering waste of resources, the clock synchronization packet exchanging method may be that each FlexE instance that is sent by the first device to the second device at all PHYs in the FlexE group carry the clock synchronization packet. For example, the instance #1 to the instance #4 in FIG. 1 all carry the clock synchronization packet; and the instance #1 to the instance #8 in FIG. 2 all carry the clock synchronization packet.

It should be further understood that, in the method procedures shown in FIG. 5 to FIG. 9, an example in which the clock synchronization packet is a 1588 packet is used for description. However, that the clock synchronization packet may only be the 1588 packet is not limited, and the clock synchronization packet is a packet used to implement synchronization between the transmit end and the receive end in the FlexE group. The packet may be a clock synchronization packet used in other approaches, for example, information used for clock synchronization such as a PTP packet and an SSM; or may be another packet that can be used to implement synchronization between the transmit end and the receive end in the FlexE group. Details are not described herein.

The foregoing describes the clock synchronization packet exchanging method with reference to FIG. 5 to FIG. 9. The following describes an apparatus for clock synchronization packet exchanging with reference to FIG. 10 to FIG. 11.

Figure 10:
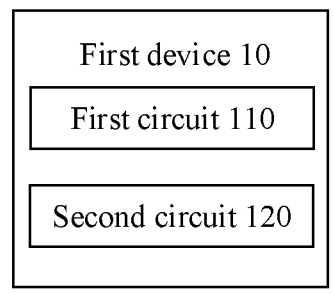
FIG. 10 is a schematic diagram of a first device 10.

FIG. 10 is a schematic diagram of a first device 10. A first circuit 110 and a second circuit 120 are included.

The first circuit 110 is configured to send a first flexible Ethernet FlexE instance at a first PHY, where the first FlexE instance includes a clock synchronization packet.

The second circuit 120 is configured to send a second FlexE instance at a second PHY, where the second FlexE instance includes a clock synchronization packet, and the first PHY and the second PHY are included in a same FlexE group.

The first device 10 is completely corresponding to the first device in method embodiments. A corresponding unit of the first device 10 is configured to perform corresponding steps performed by the first device in the method embodiments shown in FIG. 5 to FIG. 9.

The first circuit 110 in the first device 10 performs the step of sending by the first device in the method embodiments. For example, the first circuit 110 performs step 110 in FIG. 5 that the first device sends the first flexible Ethernet FlexE instance at the first PHY. The second circuit 120 in the first device 10 performs the step of sending by the first device in the method embodiments. For example, the second circuit 120 performs step 120 in FIG. 5 that the first device sends the second flexible Ethernet FlexE instance at the second PHY.

Optionally, the first device 10 shown in FIG. 10 further includes a first clock device, and the first clock device is used by the first device 10 to generate the clock synchronization packet.

Optionally, the first device 10 shown in FIG. 10 further includes a first configuration module configured to select at least two PHYs from a plurality of PHYs, so that the first device 10 sends an clock synchronization packet through the at least two PHYs.

Optionally, the first device 10 shown in FIG. 10 further includes a second configuration module configured to: when the first device 10 sends a plurality of FlexE instances at each PHY, select at least one FlexE instance from the plurality of FlexE instances to carry the clock synchronization packet.

Figure 11:
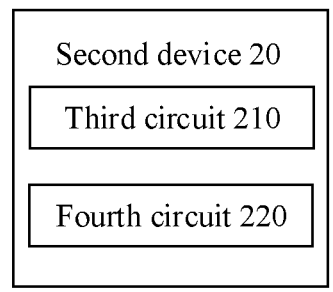
FIG. 11 is a schematic diagram of a second device 20.

FIG. 11 is a schematic diagram of a second device 20. A third circuit 210 and a fourth circuit 220 are included.

The third circuit 210 is configured to receive a first flexible Ethernet FlexE instance at a first PHY, where the first FlexE instance includes a clock synchronization packet.

The fourth circuit 220 is configured to receive a second FlexE instance at a second PHY, where the second FlexE instance includes a clock synchronization packet, and the first PHY and the second PHY are included in a same FlexE group.

The second device 20 is completely corresponding to the second device in method embodiments. A corresponding unit of the second device 20 is configured to perform corresponding steps performed by the second device in the method embodiments shown in FIG. 5 to FIG. 9.

The third circuit 210 in the second device 20 performs the step of receiving by the second device in the method embodiments. For example, the third circuit 210 performs step 110 in FIG. 5 that the second device receives the first flexible Ethernet FlexE instance at the first PHY. The fourth circuit 220 in the second device 20 performs the step of receiving by the second device in the method embodiments. For example, the fourth circuit 220 performs step 120 in FIG. 5 that the second device receives the second flexible Ethernet FlexE instance at the second PHY.

Optionally, the second device 20 shown in FIG. 11 further includes a second clock device 230 and a calibrating unit 240. The calibrating unit 240 is configured to calibrate the second clock device 230 by the second device based on the received clock synchronization packet.

Optionally, the second device 20 shown in FIG. 11 further includes a third clock device 250. The calibrating unit 240 is configured to calibrate the second clock device 230 by the second device based on the received clock synchronization packet.

An embodiment further provides a system for exchanging clock synchronization packets, including the foregoing first device and the foregoing second device.

A computer-readable storage medium stores instructions. When the instructions are run on a computer, the computer is enabled to perform the steps performed by the first device in the methods shown in FIG. 5 to FIG. 9.

A computer-readable storage medium stores instructions. When the instructions are run on a computer, the computer is enabled to perform the steps performed by the second device in the methods shown in FIG. 5 to FIG. 9.

When a computer program product is run on a computer, the computer is enabled to perform the steps performed by the first device in the methods shown in FIG. 5 to FIG. 9.

When a computer program product is run on a computer, the computer is enabled to perform the steps performed by the second device in the methods shown in FIG. 5 to FIG. 9.

A chip includes a processor. The processor is configured to read and run a computer program stored in a memory, to perform a corresponding operation and/or procedure performed by the first device in the clock synchronization packet exchanging method. Optionally, the chip further includes the memory. The memory is connected to the processor through a circuit or a cable. The processor is configured to read and execute the computer program in the memory. Optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

A chip includes a processor. The processor is configured to invoke and run a computer program stored in a memory, to perform a corresponding operation and/or procedure performed by the second device in the clock synchronization packet exchanging method. Optionally, the chip further includes the memory. The memory is connected to the processor through a circuit or a cable. The processor is configured to read and execute the computer program in the memory. Optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

A person of ordinary skill in the art may be aware that, in combination with the examples described in the embodiments disclosed in this specification, units and algorithm steps may be implemented by electronic hardware or a combination of computer software and electronic hardware. Whether functions are performed by hardware or a combination of computer software and electronic hardware depends on particular applications and design constraint conditions of the technical solutions. A person skilled in the art may use different methods to implement the described functions for each particular application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

The disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

The foregoing descriptions are merely specific implementations. A person skilled in the art may figure out another implementation within the technical scope disclosed in this disclosure.

What is claimed is:

1. A method implemented by a first device and comprising:
   sending a first Flexible Ethernet (FlexE) instance at a first physical layer (PHY) using a calendar constructed by a FlexE shim, wherein the first FlexE instance comprises a first clock synchronization packet;
   sending a second FlexE instance at a second PHY using the calendar, wherein the second FlexE instance comprises a second clock synchronization packet, and wherein the first PHY and the second PHY are in a same FlexE group;
   using, by a first clock device in the first device when the first PHY and the second PHY are in a normal state, the first clock synchronization packet or the second clock synchronization packet to perform clock synchronization on a second clock device; and
   using, by the first clock device when the first PHY is faulty, the second clock synchronization packet to perform the clock synchronization.

2. The method of claim 1, wherein the first clock synchronization packet and the second clock synchronization packet are synchronous status messages (SSMs).

3. The method of claim 1, wherein the first FlexE instance and the second FlexE instance are sent to a second device including the second clock device.

4. The method of claim 1, further comprising using, by the first clock device when the second PHY is faulty, the first clock synchronization packet to perform the clock synchronization.

5. The method of claim 1, further comprising using, by the first clock device in the first device, the first clock synchronization packet to perform first clock synchronization on the second clock device.

6. The method of claim 5, further comprising using, by the first clock device, the second clock synchronization packet to perform second clock synchronization on a third clock device.

7. The method of claim 1, wherein the first clock synchronization packet and the second clock synchronization packet are Precision Time Protocol (PTP) packets.

8. A method implemented by a second device and comprising:
   receiving a first Flexible Ethernet (FlexE) instance at a first physical layer (PHY) using a calendar constructed by a FlexE shim, wherein the first FlexE instance comprises a first clock synchronization packet;
   receiving a second FlexE instance at a second PHY using the calendar, wherein the second FlexE instance comprises a second clock synchronization packet, and wherein the first PHY and the second PHY are in a same FlexE group;
   adjusting, by the second device when the first PHY and the second PHY are in a normal state, a second clock device in the second device based on the first clock synchronization packet or in the second clock synchronization packet; and
   adjusting, when the first PHY is faulty, the second clock device based on the second clock synchronization packet.

9. The method according to claim 8, wherein the first clock synchronization packet and the second clock synchronization packet are Precision Time Protocol (PTP) packets.

10. The method of claim 8, wherein the first clock synchronization packet and the second clock synchronization packet are synchronous status messages (SSMs).

11. The method of claim 8, further comprising adjusting, when the second PHY is faulty, the second clock device based on the first clock synchronization packet.

12. The method of claim 8, further comprising adjusting the second clock device in the second device based on the first clock synchronization packet.

13. The method of claim 12, further comprising adjusting a third clock device in the second device based on the second clock synchronization packet.

14. A first device comprising:
a memory configured to store a computer program; and
a processor coupled to the memory and configured to execute the computer program to cause the first device to:
  send a first Flexible Ethernet (FlexE) instance at a first physical layer (PHY) using a calendar constructed by a FlexE shim, wherein the first FlexE instance comprises a first clock synchronization packet; and
  send a second FlexE instance at a second PHY using the calendar, wherein the second FlexE instance comprises a second clock synchronization packet, and wherein the first PHY and the second PHY are in a same FlexE group; and
a first clock device configured to:
  use, when the first PHY and the second PHY are in a normal state, the first clock synchronization packet or the second clock synchronization packet to perform clock synchronization on a second clock device in a second device; and
  use, when the first PHY is faulty, the second clock synchronization packet to perform the clock synchronization.

15. The first device of claim 14, wherein the first clock synchronization packet and the second clock synchronization packet are Precision Time Protocol (PTP) packets.

16. The first device of claim 14, wherein the first FlexE instance and FlexE instance are sent to the second device comprising the second clock device.

17. The first device of claim 14, wherein when the second PHY is faulty, the first clock device is further configured to use the first clock synchronization packet to perform the clock synchronization.

18. The first device of claim 14, wherein the first clock device is configured to use the first clock synchronization packet to perform first clock synchronization on the second clock device.

19. The first device of claim 18, wherein the first clock device is further configured to use the second clock synchronization packet to perform second clock synchronization on a third clock device.

20. The first device of claim 14, wherein the first clock synchronization packet and the second clock synchronization packet are synchronous status messages (SSMs).

* * * * *

UNITED STATES PATENT AND TRADEMARK OFFICE
CERTIFICATE OF CORRECTION

PATENT NO. : 11,750,310 B2
APPLICATION NO. : 17/471676
DATED : September 5, 2023
INVENTOR(S) : Jingfei Lv et al.

It is certified that error appears in the above-identified patent and that said Letters Patent is hereby corrected as shown below:

In the Claims

Claim 16, Column 24, Line 5: "and FlexE instance" should read "and second FlexE instance"

Signed and Sealed this
Twenty-fourth Day of October, 2023

Katherine Kelly Vidal
*Director of the United States Patent and Trademark Office*